(12) United States Patent
Sugita et al.

(10) Patent No.: US 6,811,909 B2
(45) Date of Patent: Nov. 2, 2004

(54) FUEL CELL

(75) Inventors: Narutoshi Sugita, Utsunomiya (JP); Seiji Sugiura, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 225 days.

(21) Appl. No.: 10/245,672

(22) Filed: Sep. 17, 2002

(65) Prior Publication Data

US 2003/0054216 A1 Mar. 20, 2003

(30) Foreign Application Priority Data

Sep. 19, 2001 (JP) ........................................ 2001-285546

(51) Int. Cl.[7] .......................... H01M 8/04; H01M 8/24
(52) U.S. Cl. .......................... 429/26; 429/35; 429/429; 429/38
(58) Field of Search ............................ 429/26, 35, 38

(56) References Cited

U.S. PATENT DOCUMENTS 6,261,710 B1 * 7/2001 Marianowski ............... 429/34
6,749,959 B2 * 6/2004 Kaji et al. .................... 429/34
2003/0224239 A1 * 12/2003 Carlstrom .................... 429/38

* cited by examiner

Primary Examiner—John S. Maples
(74) Attorney, Agent, or Firm—Lahive & Cockfield, LLP; Anthony A. Laurentano, Esq.

(57) ABSTRACT

There is provided a fuel cell that is reduced in both size and weight while securing a sealed state of respective communication paths by respective sealing members between separators and an electrode assembly. In this fuel cell there are provided in each one of separators communication ports for reaction gases and cooling medium that are provided on an outer side of gas sealing members, and communication paths that detour around the gas sealing members in the thickness direction of the separators and connect the reaction gas communication ports with gas communication paths. A cooling surface sealing member that seals off the cooling medium communication path from the reaction gas communication holes is placed at a position shifted from the communication paths towards the communication holes. A convex portion is provided between the reaction gas communication path and the communications ports of one separator, while a concave portion that receives the convex portion is provided in the other separator.

11 Claims, 19 Drawing Sheets

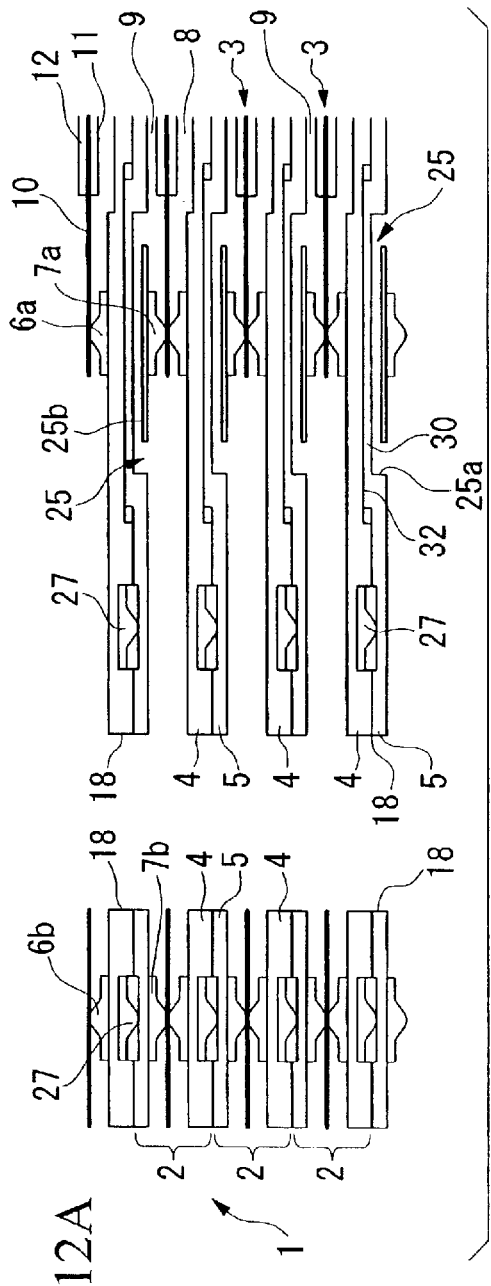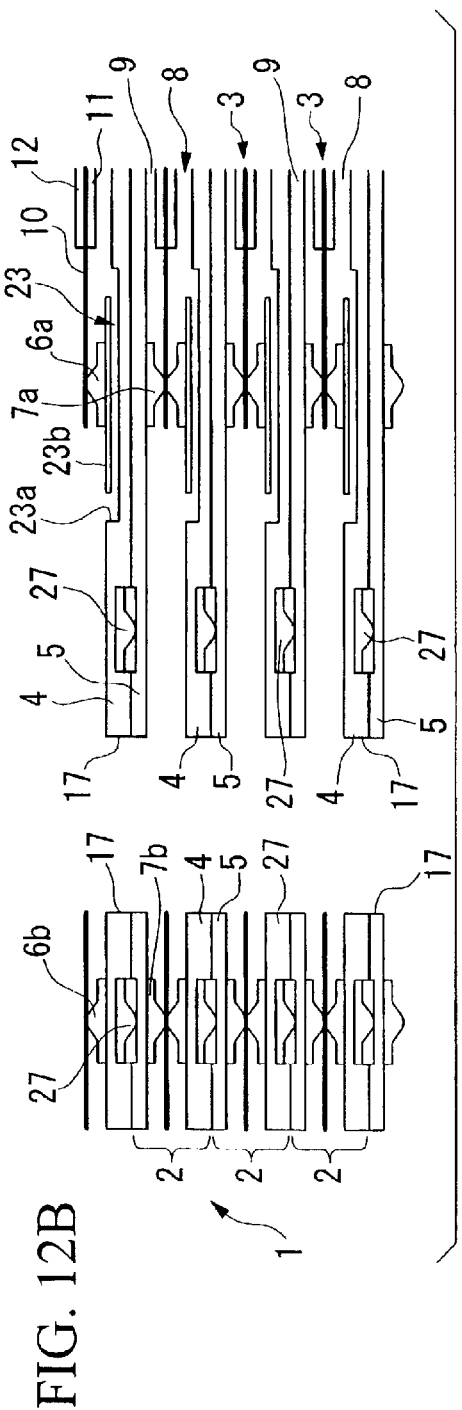

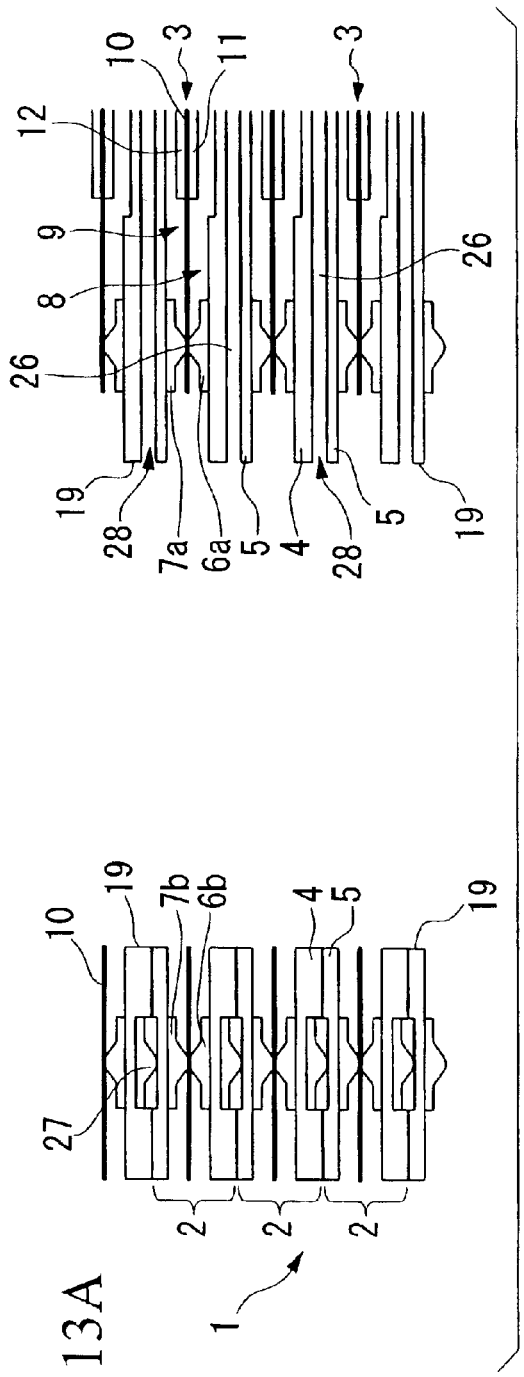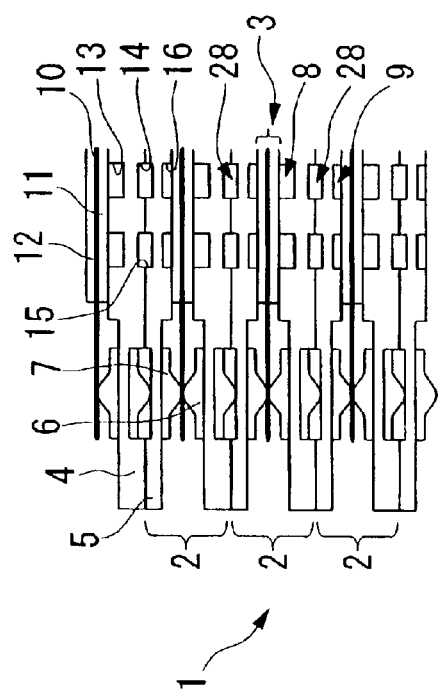
FIG. 13A
FIG. 13B

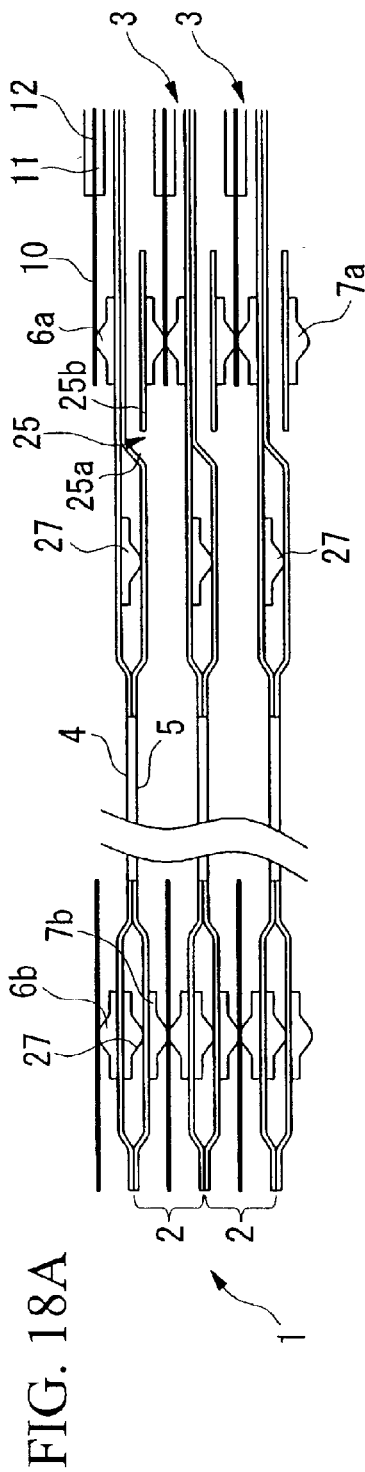
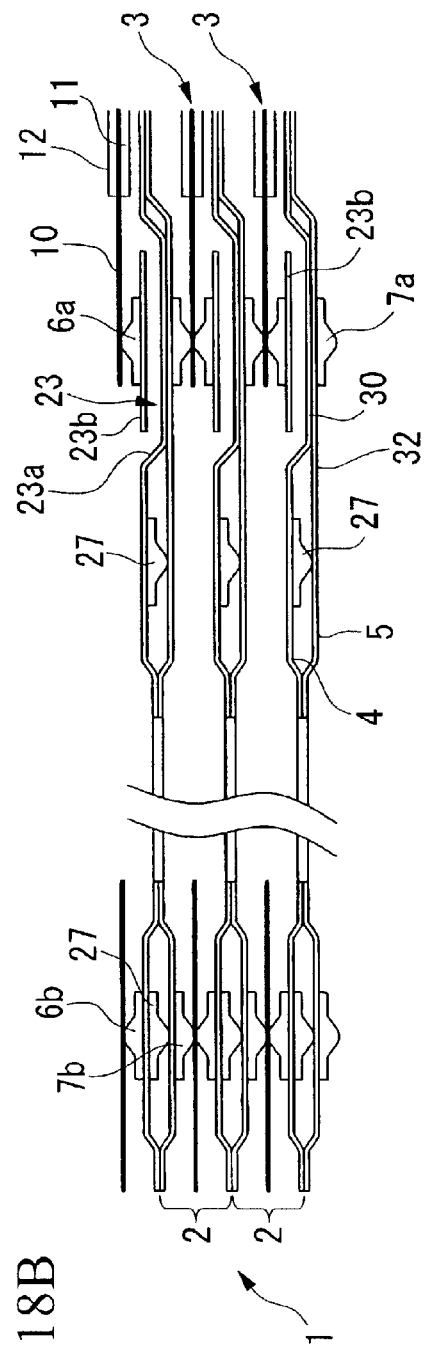
FIG. 18A
FIG. 18B

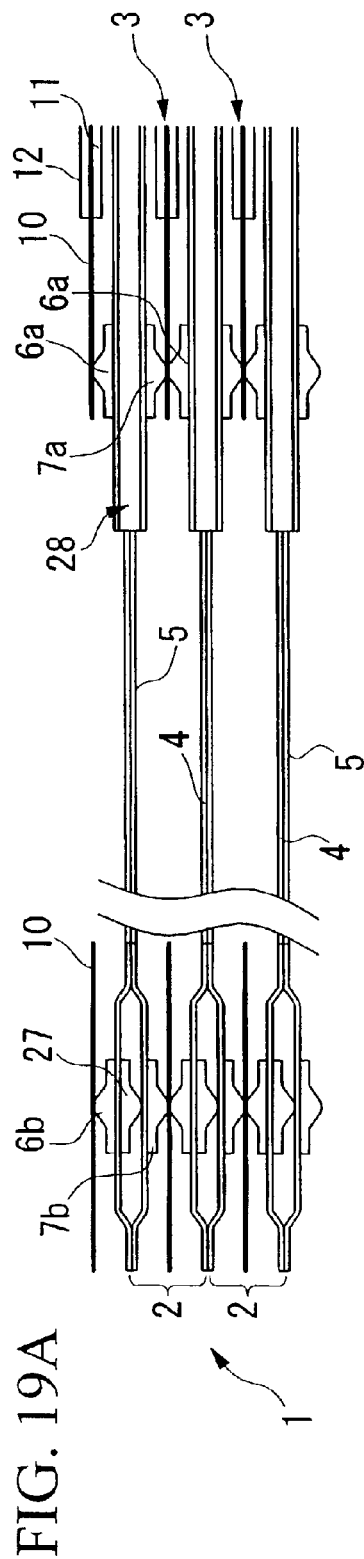
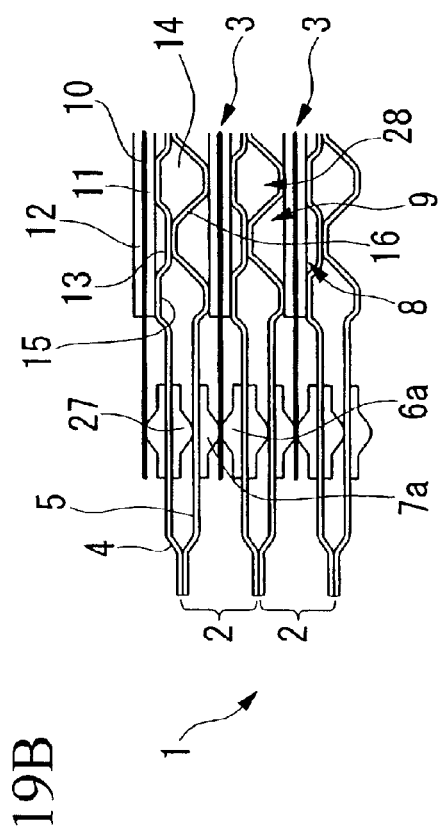
FIG. 19A
FIG. 19B

FUEL CELL

BACKGROUND OF THE INVENTION

1. Field of the Invention

The present invention relates to a fuel cell formed by stacking a plurality of fuel cell units that are formed by sandwiching an electrode assembly between separators.

2. Description of the Related Art

Among fuel cell units, there is one type that is formed in a plate shape by sandwiching between a pair of separators an electrode assembly that is formed by placing an anode electrode and a cathode electrode respectively on either side of a solid polymer electrolyte membrane. A fuel cell is formed by stacking in the thickness direction of the fuel cell units a plurality of fuel cell units that are structured in this way.

In each fuel cell unit there are provided a communication path for fuel gas (for example, hydrogen) on one surface of the anode side separator that is positioned facing the anode electrode, and a communication path for oxidizing gas (for example, air that contains oxygen) on one surface of the cathode side separator that is positioned facing the cathode electrode. In addition, a communication path for a cooling medium (for example, pure water) is provided between adjacent separators of adjacent fuel cell units.

When fuel gas is supplied to the electrode reaction surface of the anode electrode, hydrogen is ionized here and moves to the cathode electrode via the solid polymer electrolyte membrane. Electrons generated between these two are extracted to an external circuit and used as direct current electrical energy. Because oxidizing gas is supplied to the cathode electrode, hydrogen ions, electrons, and oxygen react to generate water. Because heat is generated when water is created at the electrode reaction surface, the electrode reaction surface is cooled by a cooling medium made to flow between the separators.

The fuel gas, oxidizing gas (generically known as reaction gas), and the cooling medium each need to flow through a separate communication path. Therefore, sealing technology that keeps each communication path sealed in a fluid-tight or airtight condition is essential.

Examples of portions that need to be sealed are: the peripheries of penetrating supply ports formed in order to supply and distribute reaction gas and cooling medium to each fuel cell unit of the fuel cell; the peripheries of discharge ports that collect and discharge the reaction gas and cooling medium that are discharged from each fuel cell unit; the outer peripheries of the electrode assemblies; and the outer peripheries between the separators of adjacent fuel cell units. A material that is soft yet also has the appropriate resiliency such as organic rubber is employed for the sealing member.

In recent years, however, size and weight reduction, as well as a reduction in the cost of fuel cells, have become the main barriers in progress towards the more widespread application of fuel cells through their being mounted in actual vehicles.

Methods that have been considered for reducing the size of a fuel cell include making each fuel cell unit forming the fuel cell thinner, more specifically, reducing the size of the space between separators while maintaining a maximum size for the reaction gas communication path formed inside each fuel cell unit; and also making the separators thinner.

However, a limit is imposed on how thin the separators can be made by the strength requirements for each separator and by the rigidity requirements for the fuel cell. Reducing the height of the sealing members is effective in reducing the size of the spacing between separators, however, the height of the sealing members needs to be sufficient for the sealing members to be able to be pressed down enough to ensure the required sealing performance is obtained. Therefore, there is also a limit to how much the height of the sealing members can be reduced.

Furthermore, in a fuel cell unit, although the volume occupied by the sealing members is indispensable in order for the reaction gas and cooling medium to be sealed in, because this space contributes substantially nothing to power generation it needs to be made as small as possible.

FIG. 23 is a plan view showing a conventional fuel cell. In FIG. 23 the symbol 107 indicates a communication port such as a fuel gas supply port and discharge port, an oxidizing gas supply port and discharge port, and a cooling medium supply port and discharge port that each penetrate the fuel cell 106 in the direction in which separators 109 and 110 are stacked. The symbol 112 indicates an area formed by a plurality of fuel gas communication paths, oxidizing gas communication paths, and cooling medium communication paths running along the separators 109 and 110.

FIG. 24 is a longitudinal cross-sectional view of a conventional fuel cell 106 taken along the line X—X in FIG. 23. As can be seen in plan view, in order to make the volume occupied by the sealing member (which doesn't contribute to power generation) as small as possible, conventionally, by locating gas sealing members 102 and 103, which respectively seal a fuel gas communication path 100 and an oxidizing gas communication path 101, together with a cooling surface sealing member 104, which seals a cooling medium communication path, aligned in a row in the stacking direction of the fuel cell units 105, the outer dimensions in the stacking direction of the fuel cell 106 are kept to the minimum.

However, the drawback with the fuel cell 106 that is structured in this manner is that if the gas sealing members 102 and 103 that seal the communication paths 100 and 101 as well as the cooling surface sealing member 104 are all placed in a row in the stacking direction of the fuel cell unit 105, then the thickness of the fuel cell 106 cannot be made less than a value obtained by adding the height of the cooling surface sealing member 104 to the minimum thickness of each fuel cell unit 105, and multiplying this result by the number of fuel cell units stacked in the fuel cell.

In order to explain this more specifically, the description will return to FIG. 24. FIG. 24 is a longitudinal cross-sectional view showing a cross section of the fuel cell 106 in the vicinity of the fuel gas supply port 107 in the stacking direction of the fuel cell units 105. According to FIG. 24, the fuel gas supply port 107 and the fuel gas communication path 100 that are isolated in a sealed state by the gas sealing members 102 and 103 are connected by a communication path 108. The communication path 108 is provided in the separator 109 so as to detour around, in the thickness direction of the separator 109, the gas sealing member 102 that seals the entire periphery of the fuel gas communication path 100. Moreover, the separator 110 also has a similar communication path (not shown) in the oxidizing gas supply port (not shown).

Accordingly, each of the separators 109 and 110 are formed comparatively thickly in order to form the communication path 108, however, as is seen in the cross section in FIG. 24, at the position of the seal line where each of the sealing members 102 to 104 are placed, the separators 109 and 110 are formed with the minimum thickness needed to ensure the required strength, and it is not possible to make them any thinner.

Moreover, because each of the sealing members 102 to 104 is formed with the minimum height needed to secure the sealing performance, it is not possible to reduce the height of the sealing members 102 to 104 any further.

As a result, although the thickness of the fuel cell 106 is found by multiplying the number of stacks by the sum of the minimum thickness of the two separators 109 and 110, the thickness needed to form the communication path 108, the height of the two gas sealing members 102 and 103, the thickness of the solid polymer electrolyte membrane 111, and the height of the cooling surface sealing member 104, because these are all indispensable it is extremely difficult to achieve any further reduction in thickness.

The present invention was conceived in view of the above circumstances, and it is an object thereof to provide a fuel cell that has been made lighter and smaller by reducing the thickness thereof in the stacking direction, while reliably sealing the respective communication paths using the respective sealing members between the separators and the electrode assemblies that form the fuel cell.

SUMMARY OF THE INVENTION

In order to solve the above problems, a first aspect of the present invention is a fuel cell comprising fuel cell units, the fuel cell units being stacked and having at least one cooling medium flow path therebetween, and the cooling medium flow path sealed by a cooling surface sealing member, each fuel cell unit comprising: an electrode assembly formed by disposing electrodes on both sides of an electrolyte; separators that sandwich the electrode assembly in the thickness direction thereof; and gas sealing members that are disposed at an outer peripheral portion of the electrode assembly, and that seal respective reaction gas passages that are formed between each separator and the electrode assembly and are bounded by the separators and electrode assembly, wherein in each of the separators there are provided reaction gas communication ports and cooling medium communication ports that are provided on the outer side of electrode assembly sealing members of the gas sealing members, and reaction gas communication paths that detour around the electrode assembly sealing members of the gas sealing members in the thickness direction of the separators and connect reaction gas communication ports with reaction gas passages; and in at least one separator of the separators that are disposed adjacent to each other and have the cooling medium flow path therebetween, there is provided a convex portion that protrudes from a rear surface of the reaction gas communication paths over at least an area that corresponds to the reaction gas communication paths, and in the other separator there is provided a concave portion that receives the convex portion.

According to the fuel cell of the present invention, because a convex portion is provided in one separator it is possible to reduce the thickness of this separator to the minimum, and to secure the thickness needed to form the reaction gas communication paths. Moreover, because a concave portion that receives the convex portion is provided in the other separator, it is possible to use the concave portion to cancel out the increase in thickness created by the convex portion. Accordingly, the thickness necessary to form the reaction gas communication paths may be secured by one separator and the other separator together, and it is not necessary to secure the thickness necessary to form the reaction gas communication paths in each one of both separators. Therefore, it is possible to reduce the necessary thickness of each separator by the corresponding amount, and to reduce the thickness of each fuel cell unit. Note that, if the thickness required to form the reaction gas communication paths is secured in one separator of the pair of separators, then it is possible to form the reaction gas communication path without providing the convex portion. Accordingly, because it is not necessary to provide the concave portion corresponding to the convex portion in the other separator, the thickness of the other separator can be reduced to the minimum. By employing such a structure, because the combined thickness of both separators can be maintained at the minimum value, and because the number of locations where such portions are formed is reduced by half compared with when a convex portion and concave portion are provided in both separators, the manufacturing process is simplified.

Because as many as several hundred fuel cell units may be stacked in a fuel cell, it is possible to achieve a marked size reduction in the fuel cell as a whole in accordance with how many unit cells, each of whose thickness has been reduced, are stacked.

Another aspect of the present invention is a fuel cell in which the cooling surface sealing member that seals the cooling medium communication path from the reaction gas communication ports is provided at a position that is closer to the reaction gas communication port relative to the reaction gas communication paths.

According to the fuel cell of this aspect of the invention, because the cooling surface sealing member that seals the cooling medium communication path is provided at a position that is shifted towards the communication port side from the communication paths, the position of the cooling surface sealing member in the stacking direction can be decided irrespectively of the communication paths provided in the vicinity of the gas sealing member. As a result, it is possible to overlap the position of the cooling surface sealing member with the position of the communication paths in the stacking direction of the fuel cell units. It is therefore possible to reduce the thickness of each fuel cell unit by the amount of this overlapping portion.

Yet another aspect of the present invention is a fuel cell in which, other than in the vicinity of the reaction gas communication path, the cooling surface sealing member is placed at substantially the same position as the gas sealing members as seen from a stacking direction.

According to the fuel cell of this aspect of the invention, in the vicinity of a communication path that is formed so as to detour around the gas sealing member in the thickness direction, a separator must be made thicker by the amount of the height of the communication path, therefore, the cooling surface sealing member is shifted towards the communication ports and a situation in which the gas sealing members are placed on the same seal line as the cooling surface sealing members is avoided. In portions other than the vicinity of the communication path, by placing the gas sealing members aligned in a row with the cooling surface sealing members in the stacking direction of the fuel cell units, it is possible to reduce the surface area of the fuel cell units. Moreover, by shifting the seal line in the vicinity of the communication ports, in the same way as for the fuel cell according to the above first aspect, it is possible to overlap the cooling surface sealing member with the communication paths in the stacking direction, and the cooling surface sealing member and the gas sealing member can be placed adjacent to each other in the stacking direction, thereby allowing the thickness of the fuel cell to be reduced.

In the fuel cell of the present invention, the cooling medium communication path may be formed in every space between the fuel cell units adjacent to each other.

In the fuel cell of the present invention, two or more fuel cell units may form a set of fuel cell units, and the cooling medium communication path may be formed in every space between adjacent sets of fuel cell units.

In the fuel cell of the present invention, the gas sealing member may be provided as a double sealing structure on one side of one separator forming the fuel cell unit.

In the fuel cell of the present invention, one electrode of the electrodes may extend to a size that is substantially the same as that of the electrolyte.

In the fuel cell of the present invention, the separators may be formed of metal plates by press forming.

BRIEF DESCRIPTION OF THE DRAWINGS

FIG. 12A is a longitudinal cross-sectional view taken along the line A—A in FIG. 9 showing the fuel cell shown in FIG. 1, and FIG. 12B is a longitudinal cross-sectional view taken along the line B—B showing the fuel cell shown in FIG. 1.

FIG. 13A is a longitudinal cross-sectional view taken along the line C—C in FIG. 9 showing the fuel cell shown in FIG. 1, and FIG. 13B is a longitudinal cross-sectional view taken along the line D—D showing the fuel cell shown in FIG. 1.

FIGS. 18A and 18B are longitudinal cross-sectional views showing the fifth embodiment of the present invention corresponding to FIGS. 12A and 12B of the first embodiment.

FIGS. 19A and 19B are longitudinal cross-sectional views showing the fifth embodiment of the present invention corresponding to FIGS. 13A and 13B of the first embodiment.

DESCRIPTION OF THE PREFERRED EMBODIMENTS

The fuel cell 1 according to the first embodiment of the present invention will now be described in detail with reference to the drawings.

Figure 1:
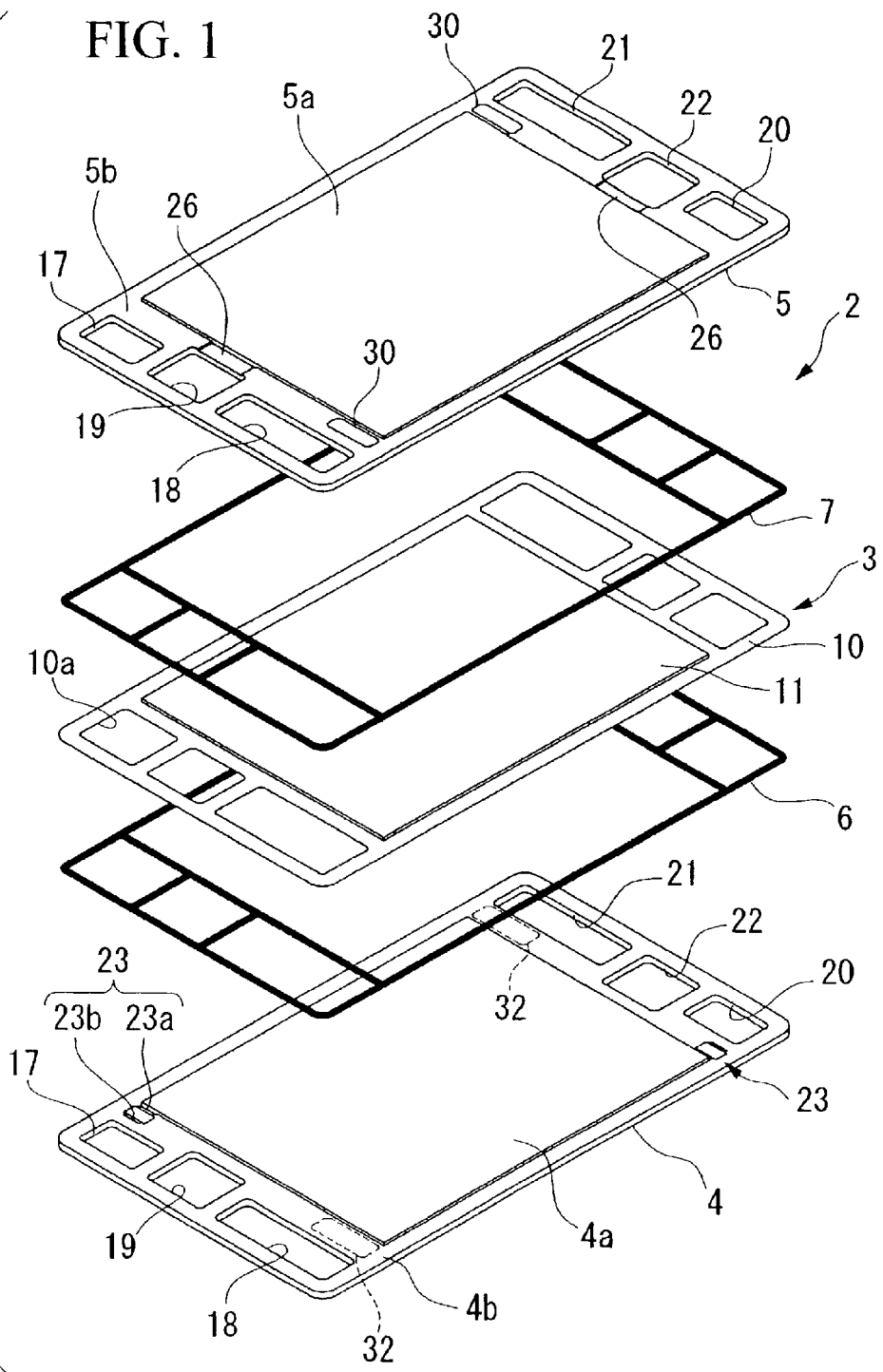
FIG. 1 is an exploded perspective view showing in typical view a fuel cell unit forming the fuel cell according to an embodiment of the present invention.

As shown in FIGS. 12A and 12B, the fuel cell 1 according to the present embodiment is formed by stacking a plurality of fuel cell units 2. As shown in FIG. 1, a fuel cell unit 2 is formed by sandwiching an electrode assembly 3 between a pair of separators 4 and 5. Between the electrode assembly 3 and each of the separators 4 and 5 are disposed respectively gas sealing members 6 and 7. As shown in FIGS. 12A and 12B, these gas sealing members 6 and 7 delimit a fuel gas passage 8 and an oxidizing gas passage 9 so as to seal them on either side of the electrode assembly 3.

Figure 2:
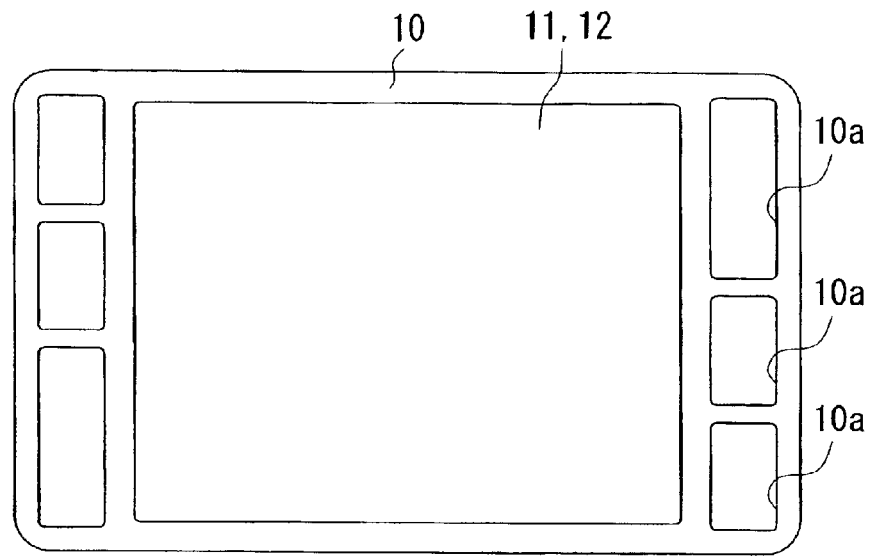
FIG. 2 is a plan view showing the electrode assembly forming the fuel cell unit shown in FIG. 1.

As shown in FIG. 2 and FIGS. 12A and 12B, the electrode assembly 3 has, for example, a solid polymer electrolyte membrane 10 (referred to below simply as an electrolyte membrane) formed from a perfluorosulfonate polymer, and an anode electrode 11 and cathode electrode 12 that sandwich two surfaces of the electrolyte membrane 10.

As shown in FIG. 2, for example, the electrolyte membrane 10 has a plurality of through holes 10a. The electrolyte membrane 10 is the equivalent size to the separators 4 and 5 that are described below, and each of the through holes 10a is placed at a position that corresponds to the respective supply ports 17 to 19 and the respective discharge ports 20 to 22 of the separators 4 and 5.

The anode electrode 11 and the cathode electrode 12 are constructed, for example, by stacking catalyst layers, formed from an alloy having Pt (platinum) as the main constituent, on a surface of a gas diffusion layer formed from porous carbon cloth or porous carbon paper that is contact with the electrolyte membrane 10.

Figure 3:
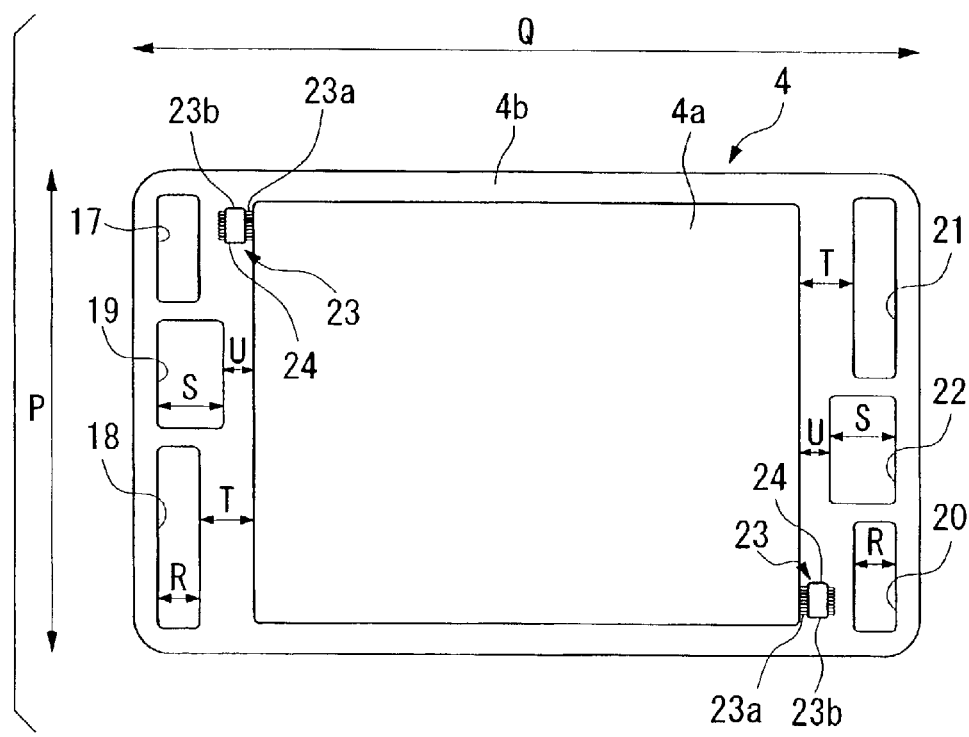
FIG. 3 is a plan view showing one separator forming the fuel cell unit shown in FIG. 1.
Figure 4:
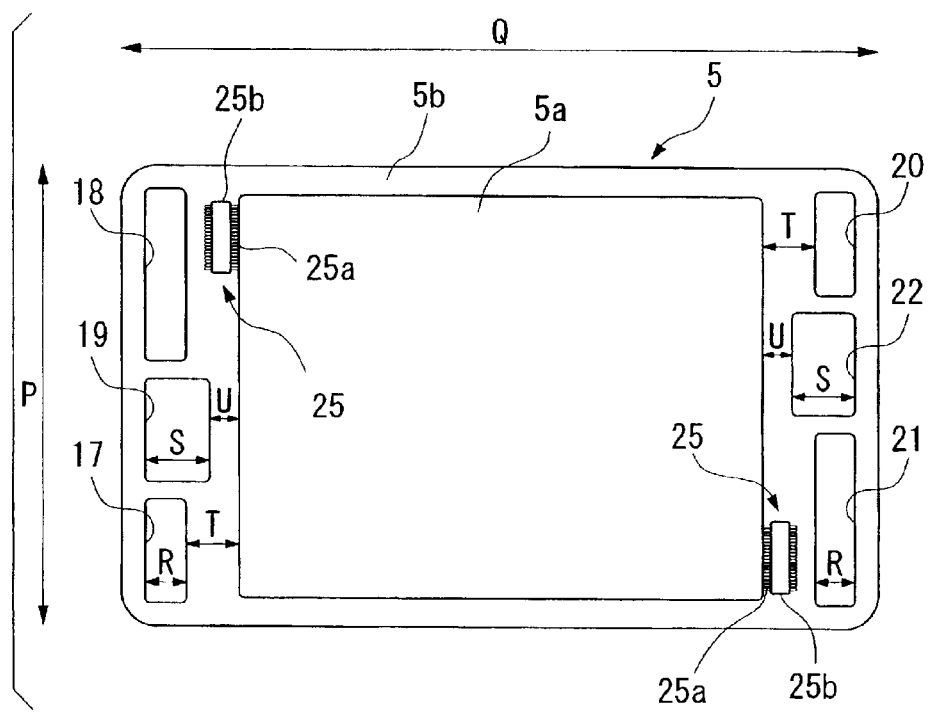
FIG. 4 is a plan view showing another separator forming the fuel cell unit shown in FIG. 1.

Two types of separator 4 and 5 may be used for the separators 4 and 5 that form the fuel cell units 2. As shown in FIGS. 3 and 4, each of the separators 4 and 5 is formed from: corrugated portions 4a and 5a made up of a plurality of indentations and bumps that have a fixed height and are formed in a fixed pattern by scraping out a plurality of grooves 13 to 16 (see FIG. 13B) in a surface of a flat plate made from carbon; a fuel gas supply port (reaction gas communication port) 17, an oxidizing gas supply port (reaction gas communication port) 18, a cooling medium supply port (cooling medium communication port) 19, a fuel gas discharge port (reaction gas communication port) 20, an oxidizing gas discharge port (reaction gas communication port) 21, and a cooling medium discharge port (cooling medium communication port) 22 that each penetrate the two separators 4 and 5 so as to make possible both the supply and discharge of fuel gas (for example, hydrogen gas), oxidizing gas (for example, air that contains oxygen), and a cooling medium (for example, pure water) respectively that are made to flow through the corrugated portions 4a and 5a; and planar portions 4b and 5b that are disposed so as to surround each of the supply ports 17 to 19, the discharge ports 20 to 22, and the corrugated portions 4a and 5a.

As shown in FIGS. 3 and 4, the cooling medium supply port 19 and the cooling medium discharge port 22 are located substantially in the center in the transverse direction of the separators 4 and 5 (i.e., the direction indicated by the arrow P). The fuel gas supply port 17 and the oxidizing gas supply port 18 are located at both sides in the transverse direction of the separators 4 and 5 (i.e., the direction indicated by the arrow P) sandwiching the cooling medium supply port 19. Furthermore, the fuel gas discharge port 20 and the oxidizing gas discharge port 21 are located at both sides in the transverse direction of the separators 4 and 5 (i.e., the direction indicated by the arrow P) sandwiching the cooling medium discharge port 22. The fuel gas discharge port 20 and the oxidizing gas discharge port 21 are located at diagonally opposite positions respectively to the fuel gas supply port 17 and the oxidizing gas supply port 18.

The lengths (as indicated by the arrow R) of the fuel gas supply port 17 and discharge port 20 and the lengths of the oxidizing gas supply port 18 and discharge port 21 in the longitudinal directions of the separators 4 and 5 (the direction indicated by the arrow Q) are made to be shorter than the lengths (as indicated by the arrow S) of the adjacent cooling medium supply port 19 and discharge port 22. As a result, the size of the space (as indicated by the arrow T) from the fuel gas supply port 17 and discharge port 20 and from the oxidizing gas supply port 18 and discharge port 21 to the corrugated portions 4a and 5a is made larger than the size of the space (as indicated by the arrow U) from the cooling medium supply port 19 and discharge port 22 to the corrugated portions 4a and 5a.

As shown in FIG. 3, between the fuel gas supply port 17 and the corrugated portion 4a and between the corrugated portion 4a and the fuel gas discharge port 20 on one surface of the one separator 4 are formed fuel gas communication paths 23 that respectively allow fuel gas supplied from the fuel gas supply port 17 to pass to the corrugated portion 4a, and fuel gas that has passed through the corrugated portion 4a to be discharged from the fuel gas discharge port 20. The fuel gas communication paths 23 are provided with a plurality of grooves 23a formed on one surface of a separator and a flat bridge plate 23b that extends right across the grooves 23a. On the front surface of the separator 4 where the bridge plate 23b is placed is formed a concave portion 24 into which the bridge plate 23b is fitted. This concave portion 24 enables the surface of the bridge plate 23b to be placed within the same planar surface as the surface 4b of the separator 4.

As shown in FIG. 4, in the same way as for the separator 4, oxidizing gas communication paths 25 formed by a plurality of grooves 25a and a bridge plate 25b are also provided between the oxidizing gas supply port 18 and the corrugated portion 5a, and between the corrugated portion 5a and the oxidizing gas discharge port 21 on one surface of the separator 5.

Figure 5A:
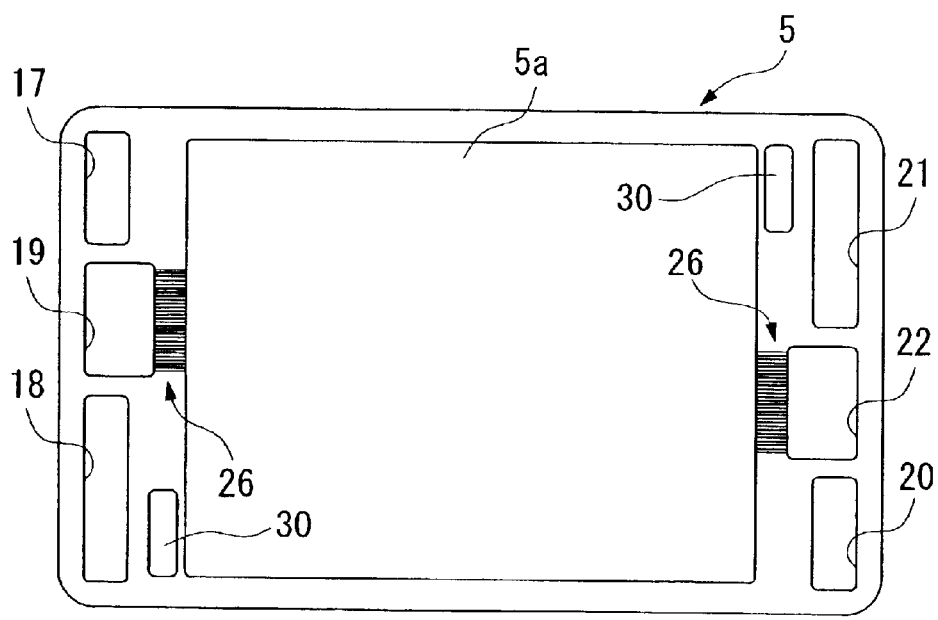
FIGS. 5A and 5B are plan views showing the rear surfaces of the separators shown in FIGS. 3 and 4.
Figure 5B:
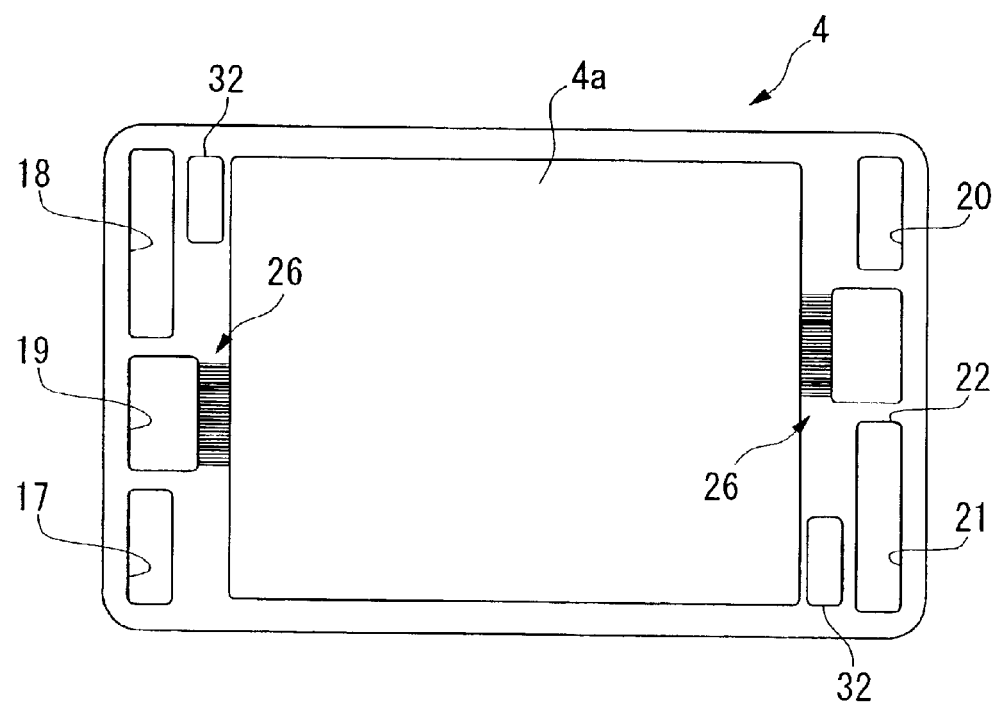

As shown in FIGS. 5A and 5B, on the other sides of the two separators 4 and 5 are provided a cooling medium communication path 26 that connects the cooling medium supply port 19 to the corrugated portions 4a and 5a, and a cooling medium communication path 26 that connects the corrugated portions 4a and 5a to the cooling medium discharge port 22. Moreover, as shown in FIG. 5A, convex portions 30 are provided in one separator 5 while, as shown in FIG. 5B, concave portions 32 that receive the convex portions 30 are provided in the other separator 4. These are described in detail below.

Figure 6:
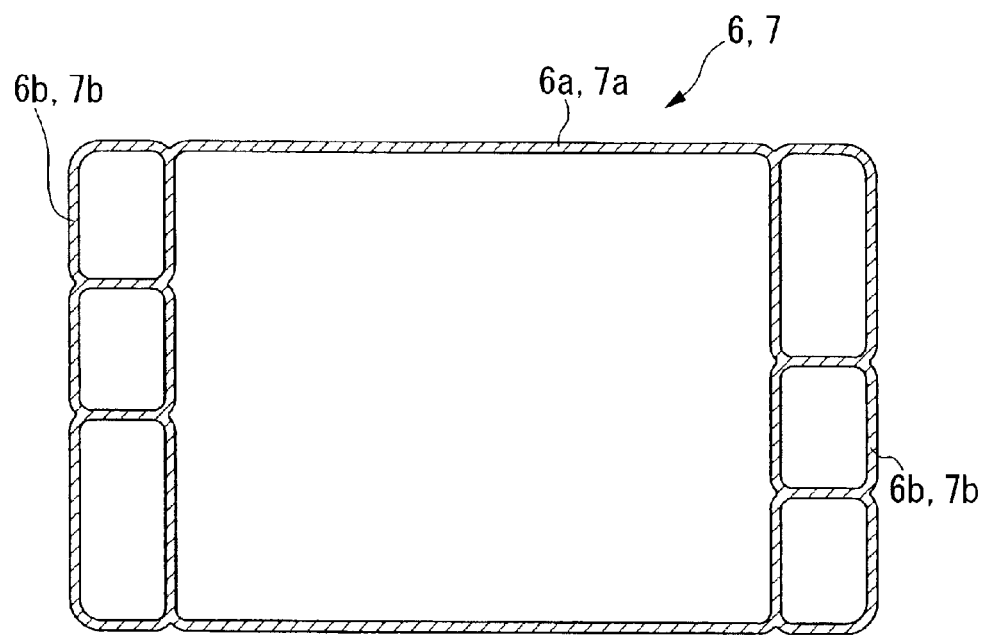
FIG. 6 is a plan view showing the gas sealing member forming the fuel cell unit shown in FIG. 1.

As shown in FIG. 6, the gas sealing members 6 and 7 are formed integrally in a configuration that has a plurality of sub-loop portions 6b and 7b that encircle each of the supply ports 17 to 19 and discharge ports 20 and 22 on both sides of main-loop portions 6a and 7a that encircle the outer peripheries of the corrugated portions 4a and 5a.

Figure 7:
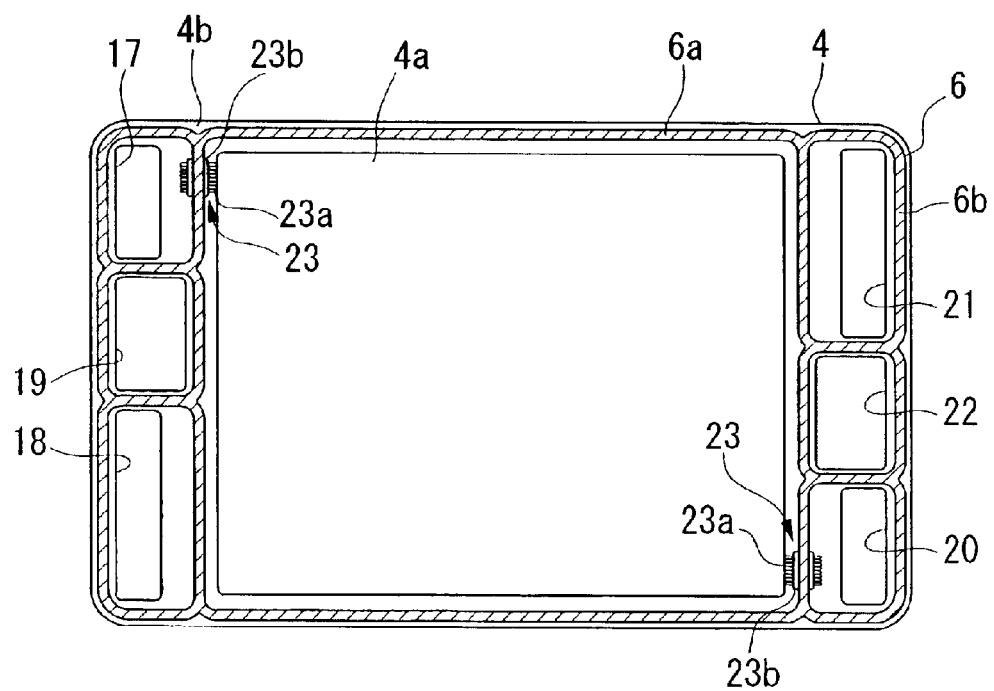
FIG. 7 is a plan view showing a state in which the gas sealing member shown in FIG. 6 is placed on the separator shown in FIG. 3.
Figure 8:
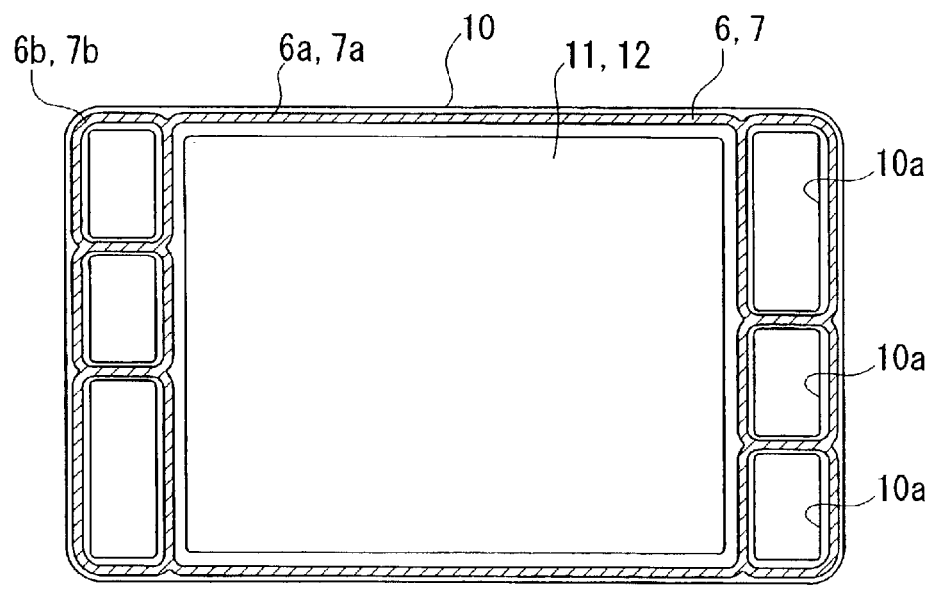
FIG. 8 is a plan view showing a state in which the gas sealing member shown in FIG. 6 is placed on the electrode assembly shown in FIG. 2.
Figure 9:
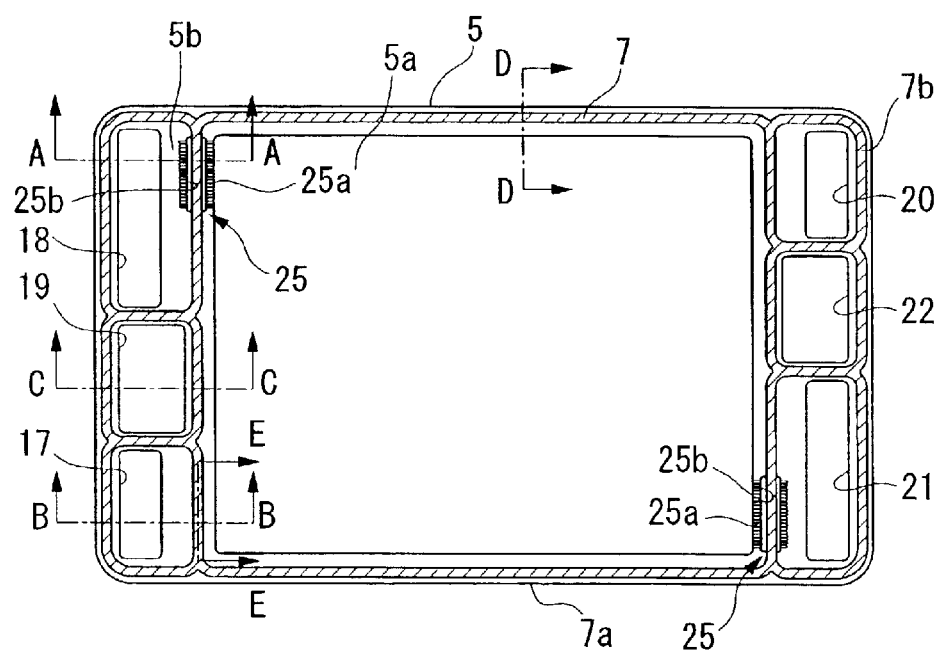
FIG. 9 is a plan view showing a state in which the gas sealing member shown in FIG. 6 is placed on the separator shown in FIG. 4.

FIGS. 7 to 9 each show a state in which these sealing members 6 and 7 are placed on one surface of the one separator 4, on one surface of the electrode assembly 3, and on one surface of the other separator 5.

As seen in FIGS. 7 to 9, the main-loop portions 6a and 7a of the gas sealing members 6 and 7 are positioned so as to run along the planar portions 4b and 5b between the respective supply ports 17 to 19 and discharge ports 20 to 22 and the corrugated portions 4a and 5a. As a result, the main-loop portions 6a and 7a pass over the top of the bridge plates 23b and 25b provided in the communication paths 23 and 25, and the respective supply ports 17 to 19 and discharge ports 20 to 22 are only connected with the corrugated portions 4a and 5a by the grooves 23a and 25a forming the communication paths 23 and 25. The remaining portions are sealed in a fluid tight state.

Figure 10:
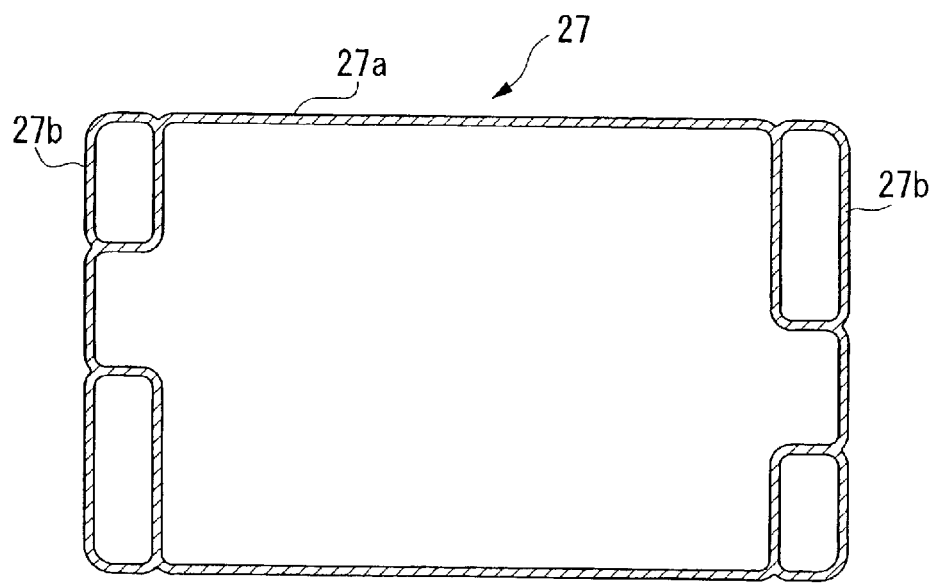
FIG. 10 is a plan view showing the cooling surface sealing member forming the fuel cell shown in FIG. 1.

As shown in FIGS. 12A and 12B, a plurality of fuel cell units 2 that are formed in this manner are stacked with cooling surface sealing members 27 interposed between each fuel cell unit 2. As shown in FIG. 10, each cooling surface sealing member 27 has a structure in which a main-loop portion 27a is joined integrally to sub-loop portions 27b.

Figure 11:
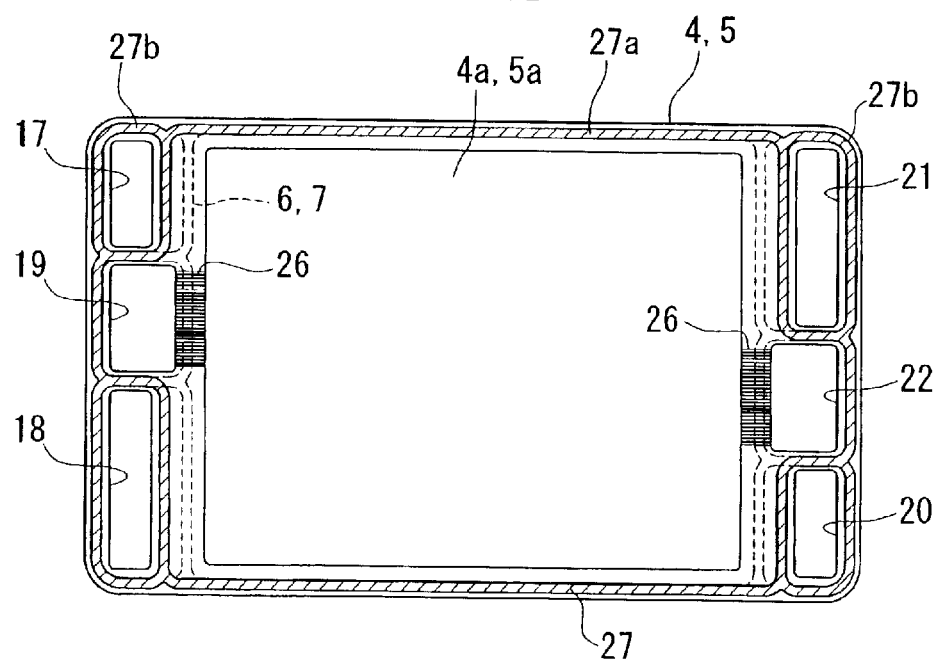
FIG. 11 is a plan view showing a state in which the cooling surface sealing member shown in FIG. 10 is placed on the separator shown in FIG. 5.

A state in which a cooling surface sealing member 27 such as this is placed on the other surface sides of each of the separators 4 and 5 is shown in FIG. 11.

As shown in FIG. 11, the main-loop portion 27a of the cooling surface sealing member 27 runs between the supply ports 17 and 18 of the fuel gas and oxidizing gas and the corrugated portions 4a and 5a, and also between the discharge ports 20 and 21 and the corrugated portions 4a and 5a, and seals the periphery of a cooling medium communication path 28 that connects the cooling medium supply port 19 to the corrugated portions 4a and 5a via the communication path 26, and connects the corrugated portions 4a and 5a to the cooling medium discharge port 22 via the communication path 26. Moreover, the sub-loop portions 27b of the cooling surface sealing portion 27 independently seal each of the fuel gas and oxidizing gas supply ports 17 and 18 and discharge ports 20 and 21. Note that in FIG. 11 the convex portion 30 and concave portion 32 that are described in detail below (see FIGS. 5A and 5B) are omitted from the drawings for reasons of clarity.

If the portions of the main-loop portion 27a of the cooling surface sealing member 27 that run between the supply ports 17 and 18 of the fuel gas and oxidizing gas and the corrugated portions 4a and 5a, and also between the discharge ports 20 and 21 and the corrugated portions 4a and 5a are compared with the positions where the main-loop portions 6a and 7a of the above described gas sealing member run along (as shown by the broken line), then it can be seen that these portions of the main-loop portion 27a are placed at different positions from the main-loop portions 6a and 7a so as to run past positions closer to the supply ports 17 and 18 and to the discharge ports 20 and 21.

Figure 14:
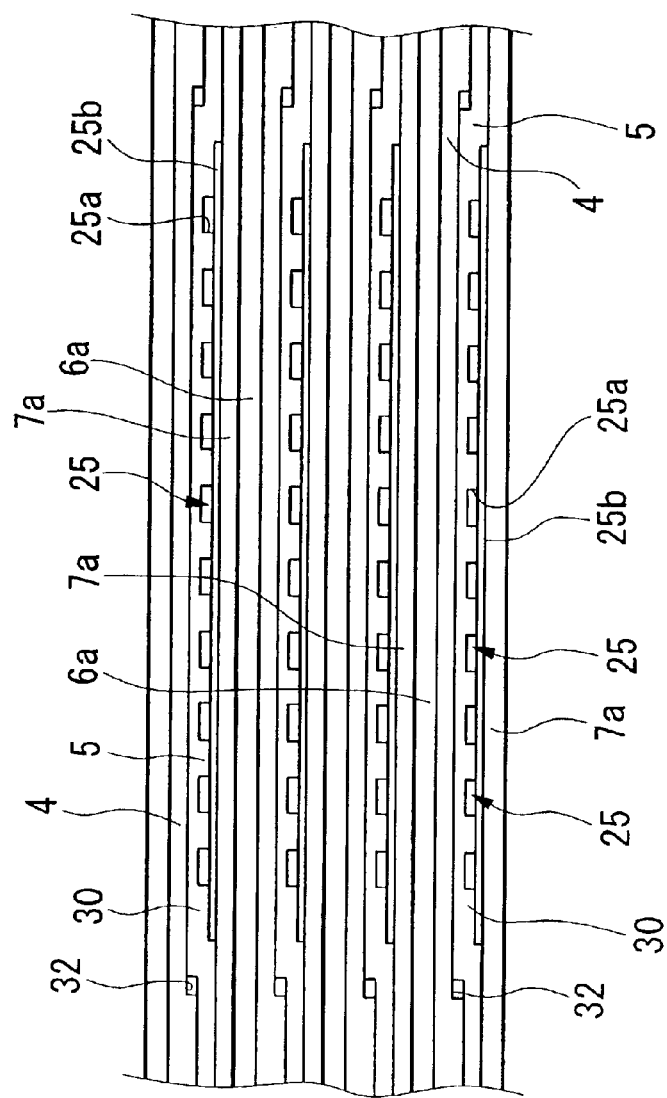
FIG. 14 is a longitudinal cross-sectional view taken along the line E—E in FIG. 9 showing the fuel cell shown in FIG. 1.

Cross sections of respective portions of a fuel cell 1 that is structured in this manner are shown in FIGS. 12A and 12B. FIG. 12A is a longitudinal cross-sectional view with the cross section taken along the line A—A in FIG. 9. FIG. 14 is a longitudinal cross-sectional view taken along the line E—E in FIG. 9. FIG. 12 shows a path that allows oxidizing gas to flow from the oxidizing gas supply port 18 that penetrates each of the separators 4 and 5 in the thickness direction thereof via the oxidizing gas communication path 25 to the oxidizing gas passage 9 formed between the cathode electrode 12 and the separator 5.

As seen in FIG. 12A, the gas sealing members 6 and 7 that seal the area between the electrode assembly 3 and the pair of separators 4 and 5 placed on either side thereof are placed sandwiching the electrolyte membrane 10 in the thickness direction thereof at a position opposite the stacking direction of the fuel cell unit 2. The main-loop portion 7a of the gas sealing member 7 of the oxidizing gas 9 is placed on a bridge plate 25b that extends right across the oxidizing gas communication path 25 formed in the separator 5. Namely, the oxidizing gas communication path 25 detours around the main-loop portion 7a of the gas sealing member 7 in the thickness direction of the separator 5, and connects the interior of the main-loop portion 7a of the gas sealing member 7 with the exterior thereof. Oxidizing gas that is supplied from the oxidizing gas supply port 18 on the exterior side of the main-loop portion 7a of the gas sealing member 7 is able to flow into the oxidizing gas passage 9 on the interior side of the main-loop portion 7a of the gas sealing member 7.

In this case, the cooling surface sealing member 27 that seals off each fuel cell unit 2 and delimits the cooling medium communication path 28 is placed at a position closer to the oxidizing gas supply port 18 than the oxidizing gas communication path 25 where the gas sealing member 7 is provided. As a result, the cooling surface sealing member 27 is able to be placed at a position where it overlaps, in the thickness direction of the separator 4, the grooves 25a forming the oxidizing gas communication path 25 that are made by carving out one surface of the separator 5 in the thickness direction thereof.

As shown in FIGS. 12A and 14, the convex portion 30 is provided over an area that corresponds to the oxidizing gas communication path 25 is provided in the one separator 5. As a result, the thickness of the grooves 25a of the relevant convex portion 30 have the thickness required to form the oxidizing gas communication path 25. The concave portion 32 that receives the convex portion 30 is provided in the other separator 4, and the convex portion 30 is housed in the concave portion 32. Because the convex portion 30 on the one separator 5 is housed within the concave portion 32 in the other separator 4 in this way, the thickness required to form the oxidizing gas communication path 25 can be secured by the one separator 5 and the other separator 4 taken together. Accordingly, because there is no need for each of the separators 4 and 5 to have a sufficient thickness to form the oxidizing gas communication path 25, as is the case conventionally, it is possible to reduce the thickness required in the two separators 4 and 5 by the corresponding amount. Therefore, it is possible to reduce the thickness of each fuel cell unit 2. Note that the concave portion 32 is made larger than the planar dimension of the convex portion 30, which simplifies the positioning when the convex portion 30 is being housed within the concave portion 32.

The above description is for the oxidizing gas supply port 18, the same description also applies in the case of the oxidizing gas discharge port 21.

FIG. 12B is a longitudinal cross-sectional view with the cross section taken along the line B—B in FIG. 9. FIG. 12B shows a path that allows fuel gas from the fuel gas supply port 17, which penetrates each of the separators 6 and 7 in the thickness direction thereof, to flow via the fuel gas communication path 23 to the fuel gas passage 8 formed between the anode electrode 11 and the separator 4.

As seen in FIG. 12B as well, the gas sealing members 6 and 7 that seal the area between the electrode assembly 3 and the pair of separators 4 and 5 placed on either side thereof are placed sandwiching the electrolyte membrane 10 in the thickness direction thereof at a position opposite the stacking direction of the fuel cell unit 2. The main-loop portion 6a of the gas sealing member 6 of the fuel gas passage 8 is placed at a position closer to the fuel gas supply port 17 than the fuel gas communication path 23 formed in the separator 4. Namely, the fuel gas communication path 23 detours around the main-loop portion 6a of the gas sealing member 6 in the thickness direction of the separator 4, and connects the interior of the main-loop portion 6a of the gas sealing member 6 with the exterior thereof. Fuel gas that is supplied from the fuel gas supply port 17 on the exterior side of the main-loop portion 6a of the gas sealing member 6 is thereby able to pass into the fuel gas passage 8 on the interior side of the main-loop portion 6a of the gas sealing member 6

Note that, unlike the separator 5 that forms the oxidizing gas communication path 25, because the separator 4 has a sufficient thickness to form the fuel gas communication path 23, it is possible to form the fuel gas communication path 23 without providing a convex portion. Accordingly, because there is no need to also provide a concave portion in the separator 5 to match the convex portion, as shown in FIGS. 12A and 12B, it is possible for the thickness of the separator 5 to be reduced to the minimum. By employing such a structure, compared with when the convex portion 30 and the concave portion 32 that receives this are each provided in both the separator 4 and the separator 5, the combined thickness of both the separator 4 and the separator 5 does not need to be changed, and the manufacturing process is simplified. Note that in the present embodiment a description is given of when the convex portion 30 is provided only in the separator 5 that forms the oxidizing gas communication path 25 and the concave portion 32 that receives the convex portion 30 is provided only in the separator 4, however, the present invention is not limited to this, and it is also possible to provide the convex portion 30 only in the separator 4 and to provide the concave portion 32 that receives the concave portion 30 only in the separator 5, or to provide both a convex portion 30 and a concave portion 32 that receives the concave portion 30 in both the separator 4 and the separator 5.

In this case, the cooling surface sealing member 27 that seals off each fuel cell unit 2 and delimits the cooling medium communication path 28 is placed at a position that is closer to the fuel gas supply port 17 side than the fuel gas communication path 23 where the gas sealing members 6 and 7 are provided. As a result, the cooling surface sealing member 27 can be placed at a position where it overlaps, in the thickness direction of the separator 4, the grooves 23a forming the fuel gas communication path 23 that are made by carving out one surface of the separator 4 in the thickness direction thereof.

The above description also applies in the case of the fuel gas discharge port 20.

Accordingly, it is possible to greatly reduce the height occupied by the cooling surface sealing member 27 that is needed by the cooling surface sealing member 27 for it to provide a sufficient sealing performance, while at the same time maintaining the thickness of the separators 4 and 5 at the positions where the communication paths 23 and 25 are formed. Moreover, because the thickness needed to form the communication paths 23 and 25 may be secured by the two separators 4 and 5, and there is no need for both of the separators 4 and 5 to each have the thickness needed to form the communication paths 23 and 25, it is possible to reduce the thicknesses needed by the respective separators 4 and 5 by the corresponding amount. Consequently, the height of the fuel cell 1 can be substantially reduced.

FIGS. 13A and 13B are longitudinal cross-sectional views taken respectively along the lines C—C and D—D in FIG. 9. These drawings show a cooling medium path that connects the cooling medium supply port 19 to the cooling medium communication path 28 delimited by adjacent fuel cell units 2, as well as the fuel gas passage 8, oxidizing gas passage 9, and cooling medium communication path 28 that are delimited by the corrugated portions 4a and 5a.

Figure 15A:
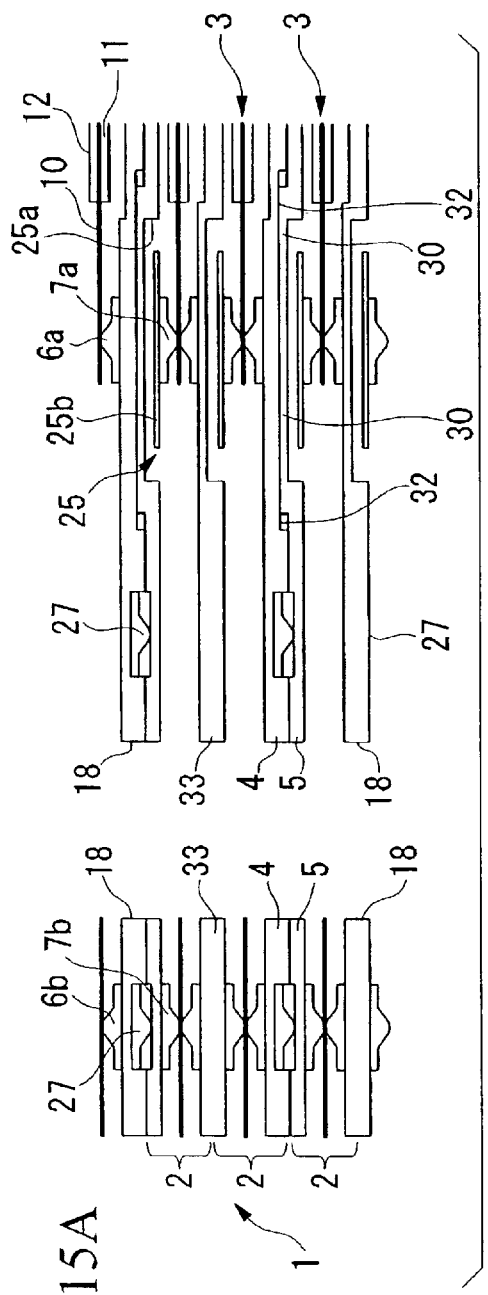
FIGS. 15A and 15B are longitudinal cross-sectional views showing the second embodiment of the present invention corresponding to FIGS. 12A and 12B of the first embodiment.
Figure 15B:
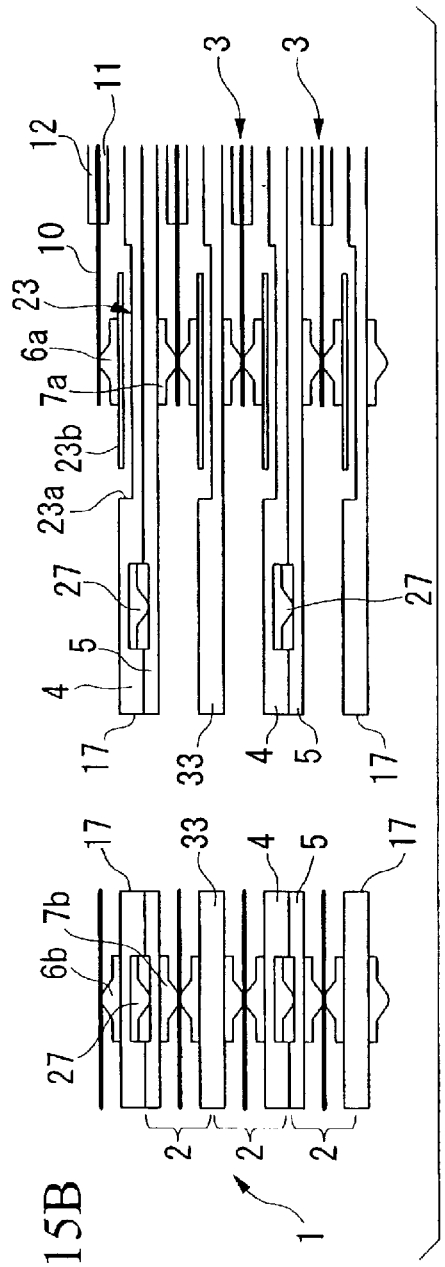

Next, FIGS. 15A and 15B show the second embodiment of the present invention and are longitudinal cross-sectional views corresponding respectively to FIGS. 12A and 12B of the first embodiment. Note that, in the present embodiment, the same descriptive symbols are given where appropriate to component elements that correspond to those of the first embodiment, and a description thereof is here omitted. This embodiment differs in that a cooling medium communication path 28 is formed for every two fuel cell units 2, and cooling is performed on every two cells (i.e., two fuel cell units). The fuel cell 1 of the present embodiment is provided with a separator 33 in which the cooling medium communication path 28 is not formed, and the separator 33 has a sufficient thickness to allow the formation of the communication paths 23 and 25. In the same way as in the first embodiment, in this embodiment as well, the effect is obtained of being able to reduce the thickness of the separators 4 and 5. In addition, the effect is obtained that it is possible to reduce the members used for cooling such as the cooling surface sealing member 27 by the same amount as the decrease in the locations where the cooling medium communication path 28 is formed, and this allows a simplification of the manufacturing process. Note that, in the present embodiment a description is given of when cooling is performed for every two cells, however, the present invention is not limited to this and the fuel cell may also be structured such that cooling is performed for every three or more fuel cell units 2.

Figure 16A:
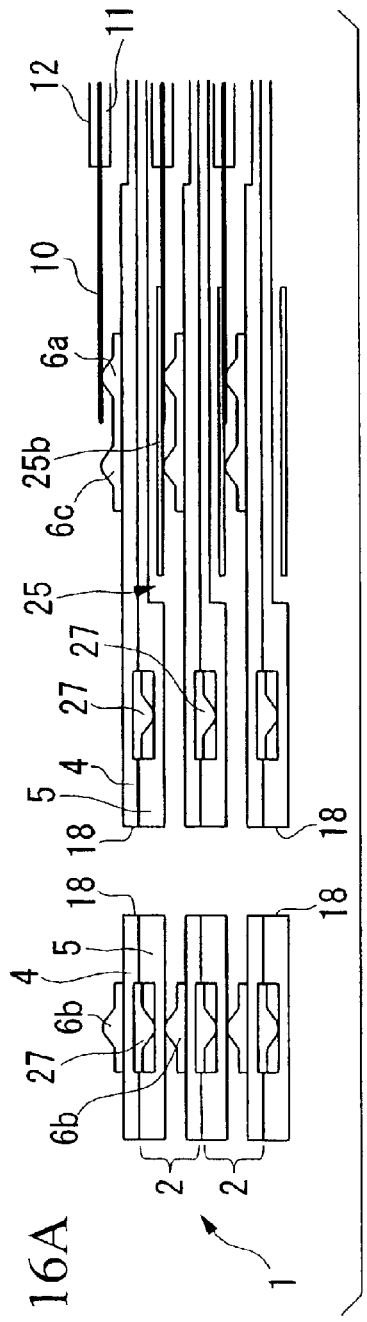
FIGS. 16A and 16B are longitudinal cross-sectional views showing the third embodiment of the present invention corresponding to FIGS. 12A and 12B of the first embodiment.
Figure 16B:
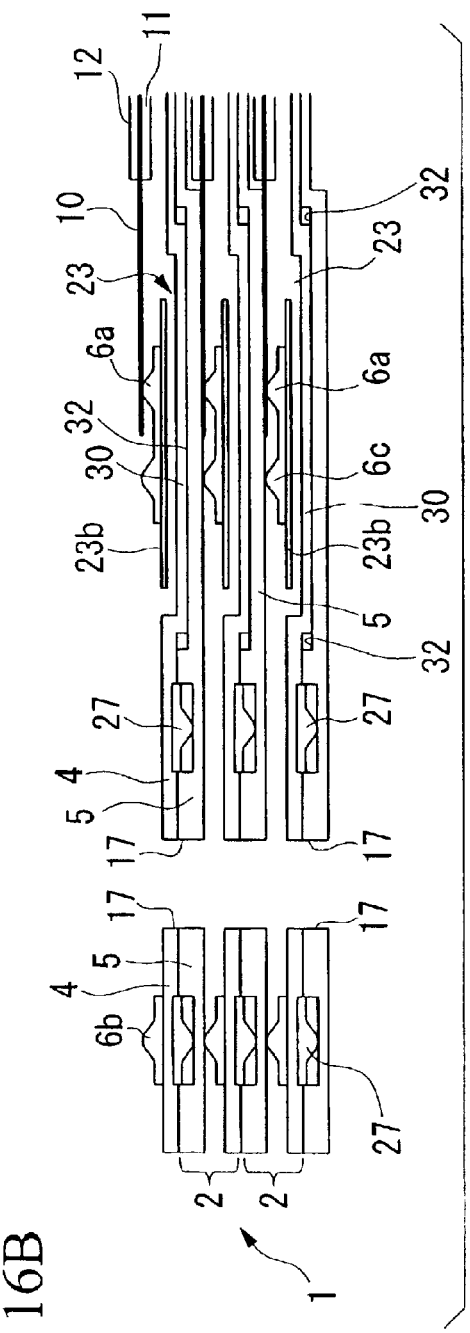

FIGS. 16A and 16B show the third embodiment of the present invention and are longitudinal cross-sectional views corresponding respectively to FIGS. 12A and 12B of the first embodiment. In this embodiment the electrode assembly 3 is sealed using only the one sealing member 6. This sealing member 6 is provided with main-loop portion 6a that is in contact with the circumferential edge portion of the solid polymer electrolyte membrane 10, and with a main-loop portion 6c that is located at the outer periphery of the main-loop portion 6a. The electrode assembly 3 is double sealed by the main-loop portions 6a and 6c. Therefore, in addition to the effects described for the first embodiment, the effect of being able to prevent leakages of gas from the electrode assembly 3 to the outside even more reliably is obtained. In the present embodiment the convex portion 30 is provided only in the separator 4 that forms the fuel gas communication path 23 and the concave portion 32 that receives the convex portion 30 is provided only in the separator 5, however, the present invention is not limited to this, and it is also possible to provide the convex portion 30 only in the separator 5 and to provide the concave portion 32 that receives the concave portion 30 only in the separator 4, or to provide both a convex portion 30 and a concave portion 32 that receives the concave portion 30 in both the separator 4 and the separator 5. Furthermore, the sealing of the electrode assembly 3 may be achieved using only a double sealing member 7 on the other side. Furthermore, the present invention is not limited to a double sealing structure and a multiple sealing structure formed by three or more seals may be employed. Furthermore, a combination of the multiple sealing structure of the present embodiment with the structure in which cooling is performed for groups consisting of a plurality of cells of the above embodiment may also be employed.

Figure 17A:
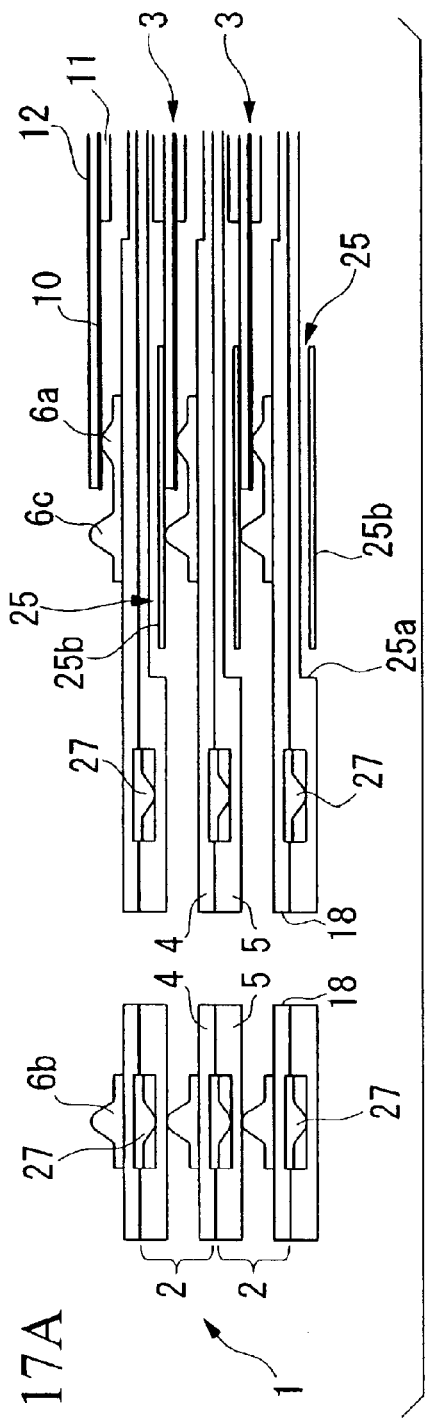
FIGS. 17A and 17B are longitudinal cross-sectional views showing the fourth embodiment of the present invention corresponding to FIGS. 12A and 12B of the first embodiment.
Figure 17B:
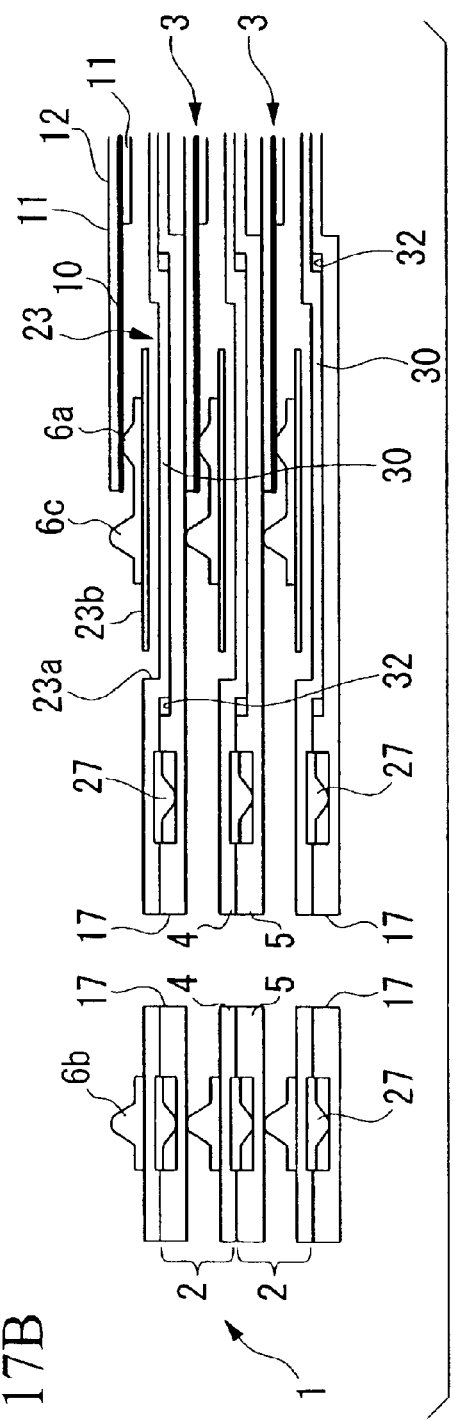

FIGS. 17A and 17B show the fourth embodiment of the present invention and are longitudinal cross-sectional views corresponding respectively to FIGS. 12A and 12B of the first embodiment. This embodiment differs in that the cathode electrode 12 is formed the same size as the solid polymer electrolyte membrane 10 that is larger than the anode electrode 11. In this embodiment, in addition to the effects provided by the first embodiment, the effect is obtained that it is possible to increase the strength in the thickness direction of the electrode assembly 3 by reinforcing the solid polymer electrolyte membrane 10 with the cathode membrane 12. Note that it is also possible to make the anode electrode 11 larger than the cathode electrode 12, and to further change the structure in the manners described in the above embodiments.

FIGS. 18A and 18B and 19A and 19B show the fifth embodiment of the present invention and are longitudinal cross-sectional views corresponding respectively to FIGS. 12A and 12B and 13A and 13B of the first embodiment. In this embodiment, the separator 4 and the separator 5 are provided with corrugated portions 4a and 5a, supply ports 17 to 19, discharge ports 20 to 22, and planar sections 4b and 5b, as shown in FIG. 1, by press forming a stainless steel plate with a plate thickness of approximately 0.2 to 0.5 mm. In the same way as in the first embodiment, in the fuel cell 1 of the present embodiment the cooling surface sealing member 27 that seals off each fuel cell unit 2 and delimits the cooling medium communication path 28 is placed at a position closer to the respective supply ports 18 than the communication paths 23 and 25 where the main-loop portion 7a of the gas sealing member 7 is provided. As a result, the cooling surface sealing member 27 is able to be placed at a position where it overlaps, in the thickness direction, the grooves 23a and 25a of the oxidizing gas communication paths 23 and 25 that are formed by joining together surfaces of both the separator 4 and the separator 5. It is therefore possible to reduce the thickness of each fuel cell unit 2 by the amount of this overlapping portion. Moreover, a convex portion 30 is provided on the separator 4 extending over an area corresponding to the gas communication path 23, and a concave portion 32 that receives the convex portion 30 is provided in the separator 5 thereby providing the thickness necessary to form the fuel gas communication path 23. Accordingly, in the same way as in the first embodiment, it is possible to reduce the thickness of each fuel cell unit 2 and to greatly reduce the height of the fuel cell 1 even if the separators 4 and 5 are formed by press forming a metal material.

Figure 20A:
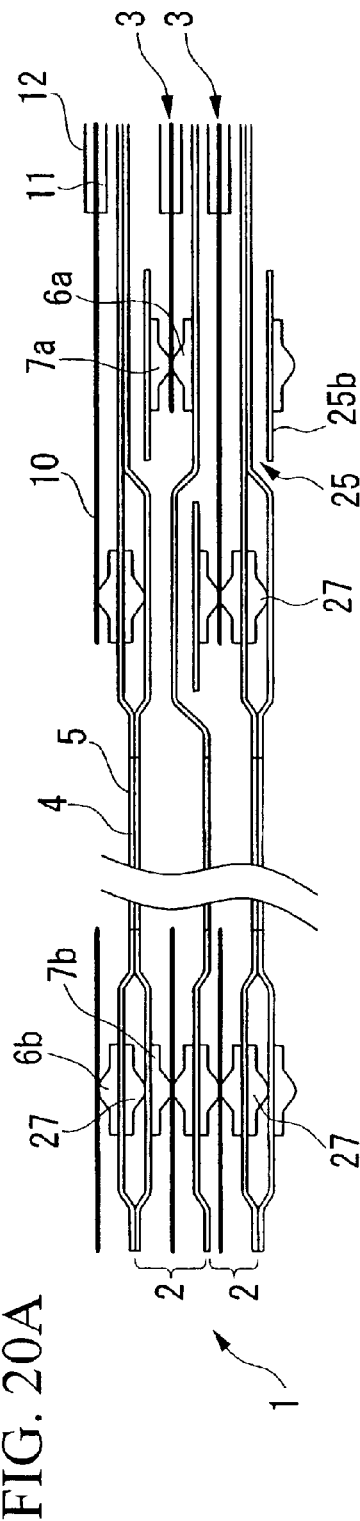
FIGS. 20A and 20B are longitudinal cross-sectional views showing the sixth embodiment of the present invention corresponding to FIGS. 12A and 12B of the first embodiment.
Figure 20B:
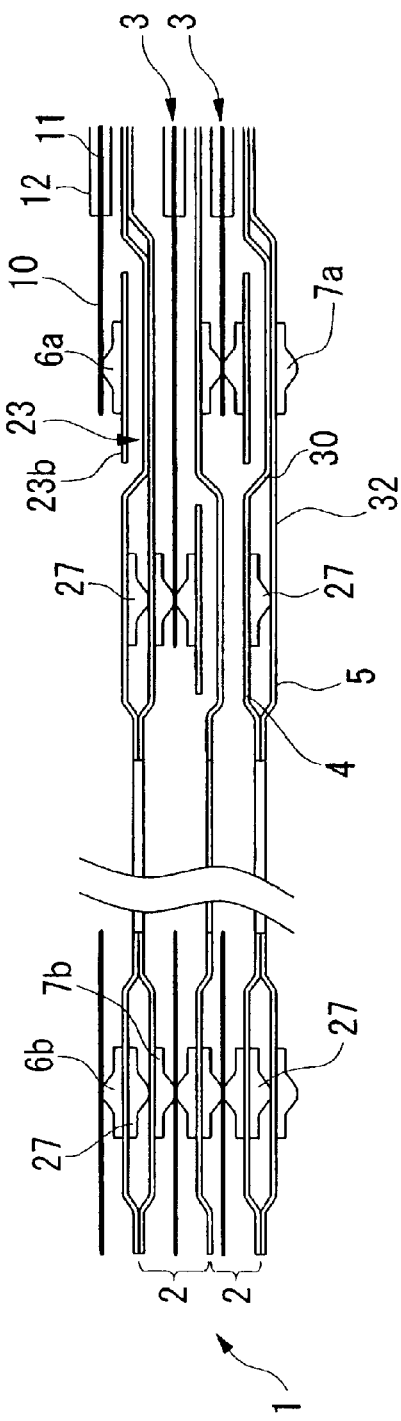

Next, FIGS. 20A and 20B show the sixth embodiment of the present invention and are longitudinal cross-sectional views corresponding respectively to FIGS. 12A and 12B of the first embodiment. In this embodiment, in the same way as in the fifth embodiment, the separator 4 and the separator 5 are provided with corrugated portions 4a and 5a, supply ports 17 to 19, discharge ports 20 to 22, and planar sections 4b and 5b, as shown in FIG. 1, by press forming a stainless steel plate. In addition, in the present embodiment, in the same way as in the second embodiment, a cooling medium communication path 28 is formed for every two fuel cell units 2, and cooling is performed on every two cells (i.e., two fuel cell units), thereby providing the same effects as in the second embodiment.

Figure 21A:
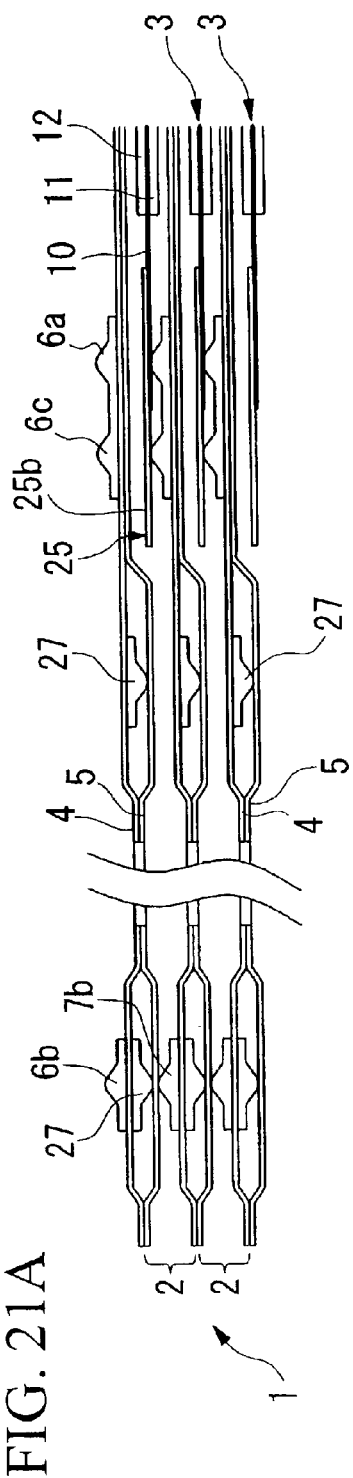
FIGS. 21A and 21B are longitudinal cross-sectional views showing the seventh embodiment of the present invention corresponding to FIGS. 12A and 12B of the first embodiment.
Figure 21B:
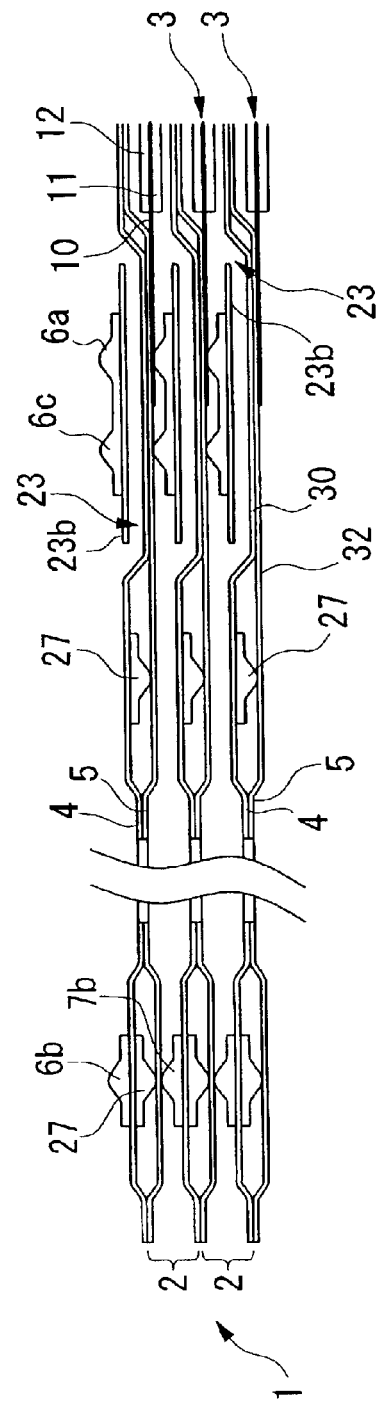

Next, FIGS. 21A and 21B show the seventh embodiment of the present invention and are longitudinal cross-sectional views corresponding respectively to FIGS. 12A and 12B of the first embodiment. In this embodiment, in the same way as in the fifth embodiment, the separator 4 and the separator 5 are provided with corrugated portions 4a and 5a, supply ports 17 to 19, discharge ports 20 to 22, and planar sections 4b and 5b, as shown in FIG. 1, by press forming a stainless steel plate. In addition, in the present embodiment, in the same way as in the third embodiment, the sealing of the electrode assembly 3 is performed only by the sealing member 6, and a double seal is used, thereby providing the same effects as in the third embodiment.

Figure 22A:
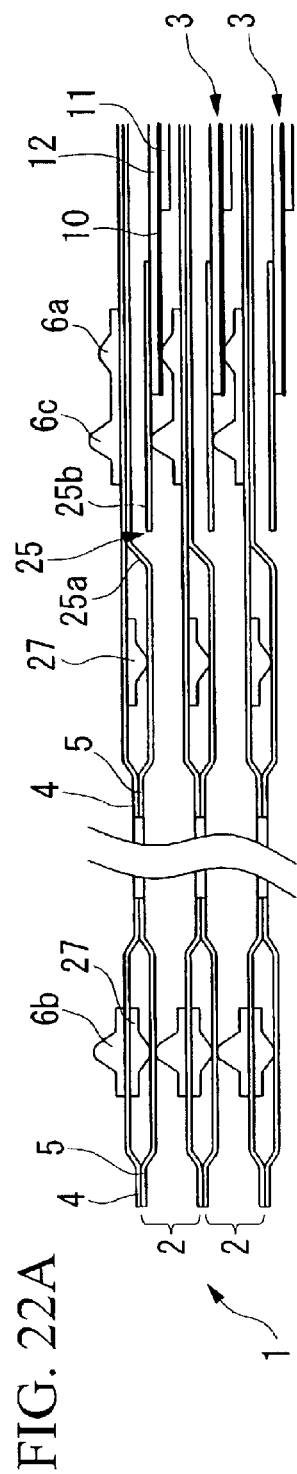
FIGS. 22A and 22B are longitudinal cross-sectional views showing the eighth embodiment of the present invention corresponding to FIGS. 12A and 12B of the first embodiment.
Figure 22B:
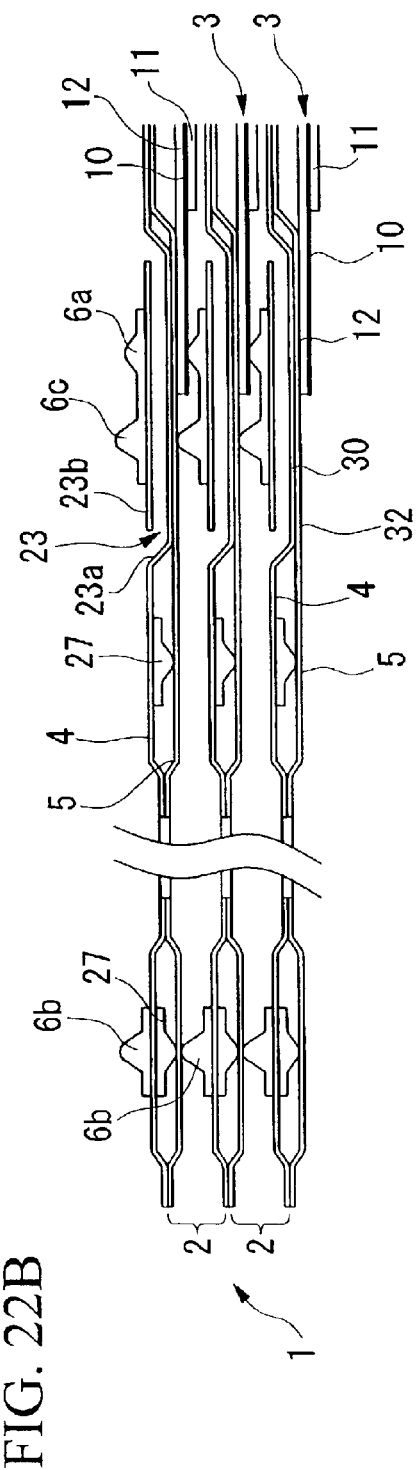
Figure 23:
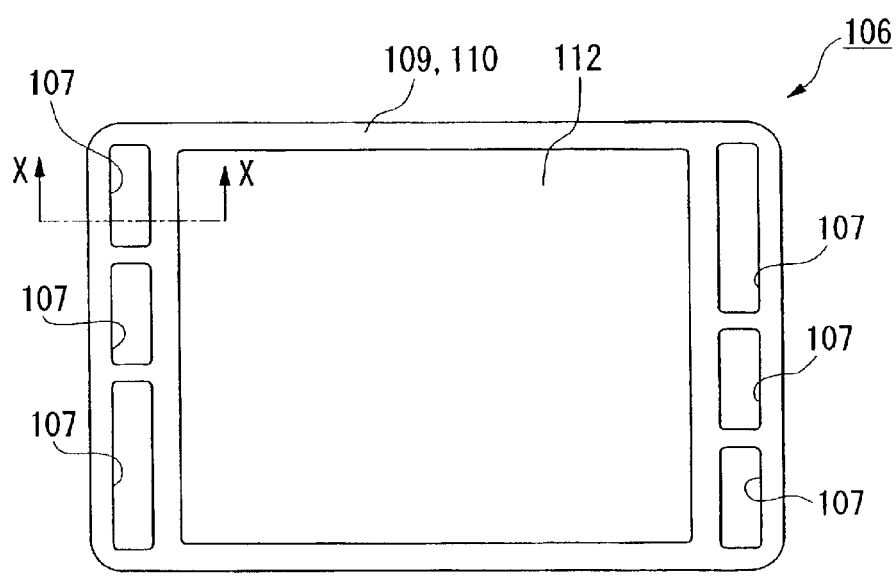
FIG. 23 is a plan view schematically showing a fuel cell unit in a conventional fuel cell.
Figure 24:
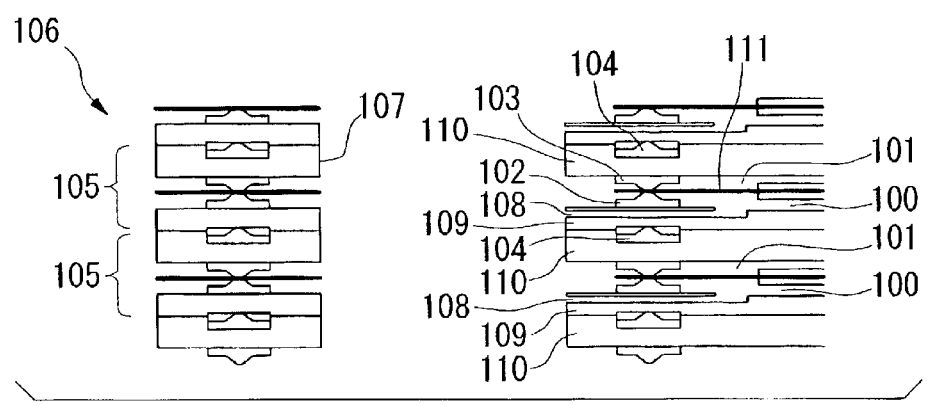
FIG. 24 is a longitudinal cross-sectional view showing the vicinity of a fuel gas supply port in the fuel cell shown in FIG. 23 taken along the line X—X.

Next, FIGS. 22A and 22B show the eighth embodiment of the present invention and are longitudinal cross-sectional views corresponding respectively to FIGS. 12A and 12B of the first embodiment. In this embodiment, in the same way as in the fifth embodiment, the separator 4 and the separator 5 are provided with corrugated portions 4a and 5a, supply ports 17 to 19, discharge ports 20 to 22, and planar sections 4b and 5b, as shown in FIG. 1, by press forming a stainless steel plate. In addition, in the present embodiment, in the same way as in the fourth embodiment, the cathode electrode 12 is formed the same size as the solid polymer electrolyte membrane 10 that is larger than the anode electrode 11, thereby providing the same effects as in the fourth embodiment.

POSSIBLE INDUSTRIAL APPLICATIONS

As is clear from the above description, the present invention provides the following effects.
(1) According to the fuel cell according to an aspect of the present invention, the thickness necessary to form a reaction gas communication path may be secured by one separator and the other separator together, and because it is not necessary to secure the thickness necessary to form a reaction gas communication path in each one of both separators, it is possible to reduce the necessary thickness of each separator by the corresponding amount, and to reduce the thickness of each fuel cell unit. As a result, the effect is obtained that it is possible to greatly reduce the thickness of a fuel cell that is formed by stacking up a plurality of fuel cell units.
(2) According to the fuel cell according to another aspect of the present invention, because it is possible to overlap the position of a communication path with the position of a cooling surface sealing member in the thickness direction of the fuel cell unit, the thickness of the fuel cell unit can be thinned down by the size of the overlapping portion. As a result, the effect is obtained that it is possible to greatly reduce the thickness of a fuel cell that is formed by stacking up a plurality of fuel cell units.
(3) According to the fuel cell according to yet another aspect of the present invention, in the vicinity of the communication path the aforementioned cooling surface sealing member is shifted away from a communication path, while in the remaining areas the cooling surface sealing member is aligned in a row in the thickness direction with a gas sealing member. As a result, it is possible to greatly reduce the size of a fuel cell in the thickness direction thereof while suppressing any increase in the surface area of the fuel cell.

What is claimed is:

1. A fuel cell comprising fuel cell units, the fuel cell units being stacked and having at least one cooling medium flow path therebetween, and the cooling medium flow path sealed by a cooling surface sealing member, each fuel cell unit comprising:

an electrode assembly formed by disposing electrodes on both sides of an electrolyte;

separators that sandwich the electrode assembly in the thickness direction thereof; and gas sealing members that are disposed at an outer peripheral portion of the electrode assembly, and that seal respective reaction gas passages that are formed between each separator and the electrode assembly and are bounded by the separators and electrode assembly, wherein in each of the separators there are provided reaction gas communication ports and cooling medium communication ports that are provided on the outer side of electrode assembly sealing members of the gas sealing members, and reaction gas communication paths that detour around the electrode assembly sealing members of the gas sealing members in the thickness direction of the separators and connect reaction gas communication ports with reaction gas passages; and in at least one separator of the separators that are disposed adjacent to each other and have the cooling medium flow path therebetween, there is provided a convex portion that protrudes from a rear surface of the reaction gas communication paths over at least an area that corresponds to the reaction gas communication paths, and in the other separator there is provided a concave portion that receives the convex portion.

2. The fuel cell according to claim 1, wherein the cooling surface sealing member that seals the cooling medium communication path from the reaction gas communication ports is provided at a position that is closer to the reaction gas communication port relative to the reaction gas communication paths.

3. The fuel cell according to claim 1, wherein, other than in the vicinity of the reaction gas communication path, the cooling surface sealing member is placed at substantially the same position as the gas sealing members as seen from a stacking direction.

4. The fuel cell according to claim 1, wherein the cooling medium communication path is formed in every space between the fuel cell units adjacent to each other.

5. The fuel cell according to claim 1, wherein two or more fuel cell units form a set of fuel cell units, and the cooling medium communication path is formed in every space between adjacent sets of fuel cell units.

6. The fuel cell according to claim 1, wherein the gas sealing member is provided as a double sealing structure on one side of one separator forming the fuel cell unit.

7. The fuel cell according to claim 1, wherein one electrode of the electrodes extends to a size that is substantially the same as that of the electrolyte.

8. The fuel cell according to claim 1, wherein the separators are formed of metal plates by press forming.

9. The fuel cell according to claim 8, wherein two or more fuel cell units form a set of fuel cell units, and the cooling medium communication path is formed in every space between adjacent sets of fuel cell units.

10. The fuel cell according to claim 8, wherein the gas sealing member is provided as a double sealing structure on one side of one separator forming the fuel cell unit.

11. The fuel cell according to claim 8, wherein one electrode of the electrodes extends to a size that is substantially the same as that of the electrolyte.

* * * * *